United States Patent [19]
Watanabe et al.

[11] Patent Number: 5,461,453
[45] Date of Patent: Oct. 24, 1995

[54] APPARATUS FOR ORDERING TO PHOTOTAKE WITH EYE-DETECTION

[75] Inventors: Toshimi Watanabe, Machida; Hideya Inoue, Yokohama, both of Japan

[73] Assignee: Nikon Corporation, Tokyo, Japan

[21] Appl. No.: 357,167

[22] Filed: Dec. 13, 1994

Related U.S. Application Data

[60] Continuation of Ser. No. 189,032, Jan. 31, 1994, abandoned, which is a division of Ser. No. 82,736, Jun. 28, 1993, abandoned, which is a division of Ser. No. 774,976, Oct. 15, 1991, Pat. No. 5,245,381, which is a continuation-in-part of Ser. No. 744,496, Aug. 14, 1991, abandoned.

[30] Foreign Application Priority Data

| Aug. 20, 1990 | [JP] | Japan | 2-218527 |
| Oct. 19, 1990 | [JP] | Japan | 2-282757 |
| Oct. 25, 1990 | [JP] | Japan | 2-111727 U |
| Dec. 11, 1990 | [JP] | Japan | 2-409980 |

[51] Int. Cl.$^6$ .................. G03B 13/02; G03B 17/20
[52] U.S. Cl. ............................. 354/471; 354/219
[58] Field of Search ................... 354/410, 432, 354/62, 219, 471

[56] References Cited

U.S. PATENT DOCUMENTS 5,036,347  7/1991  Tsunekawa et al. ............. 354/219 X

*Primary Examiner*—W. B. Perkey
*Attorney, Agent, or Firm*—Shapiro and Shapiro

[57] ABSTRACT

A camera operation directing device includes an eye-gaze direction detection device for detecting a direction of an eye-gaze of an observer who is looking into a finder, in a predetermined eye-gaze operation area within the finder and for outputting an eye-gaze operation signal, and a photographic operation direction device for directing the photographic operation, including at least starting of a phototaking operation, in accordance with the eye-gaze operation signal from the eye-gaze direction detection device.

9 Claims, 23 Drawing Sheets

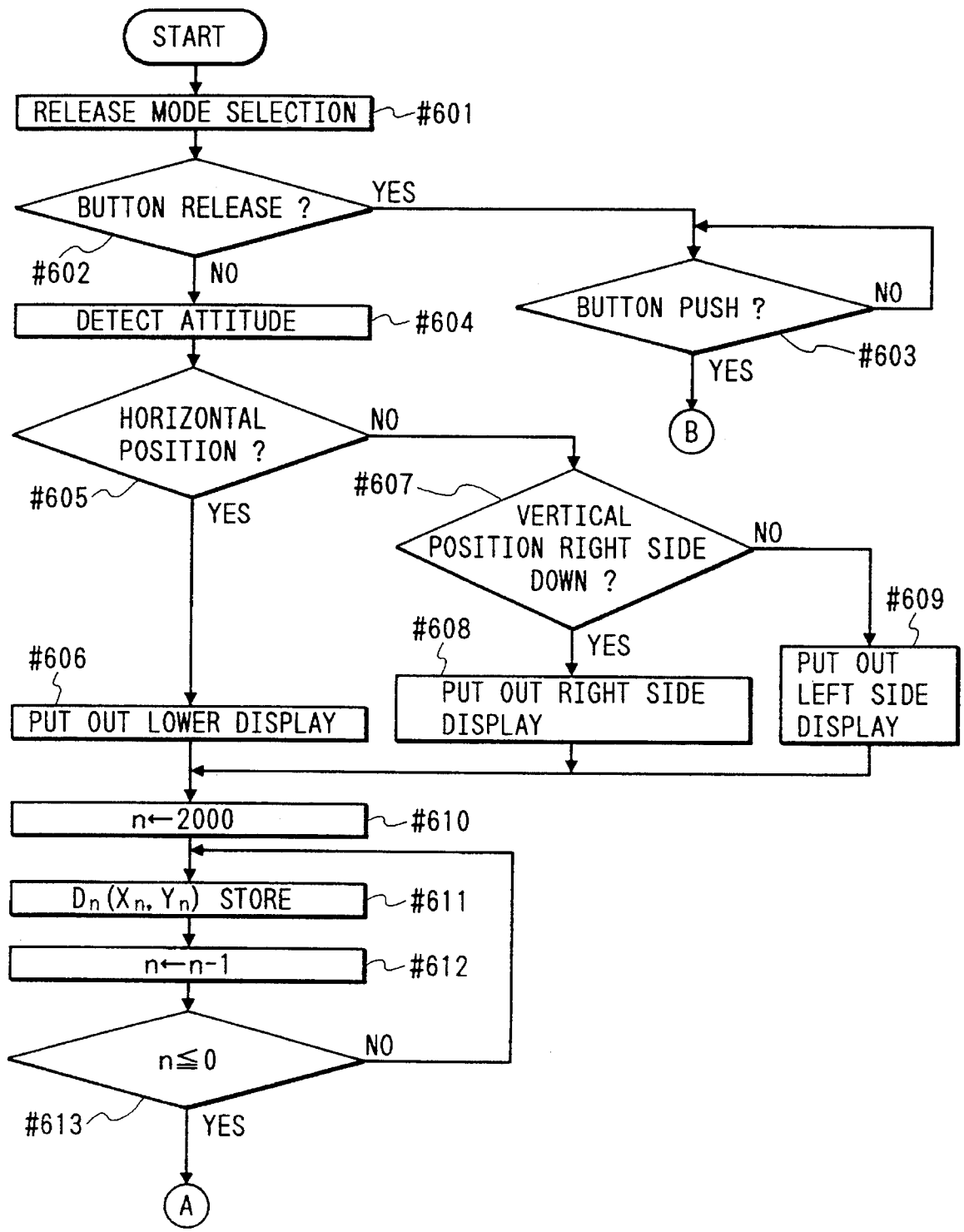

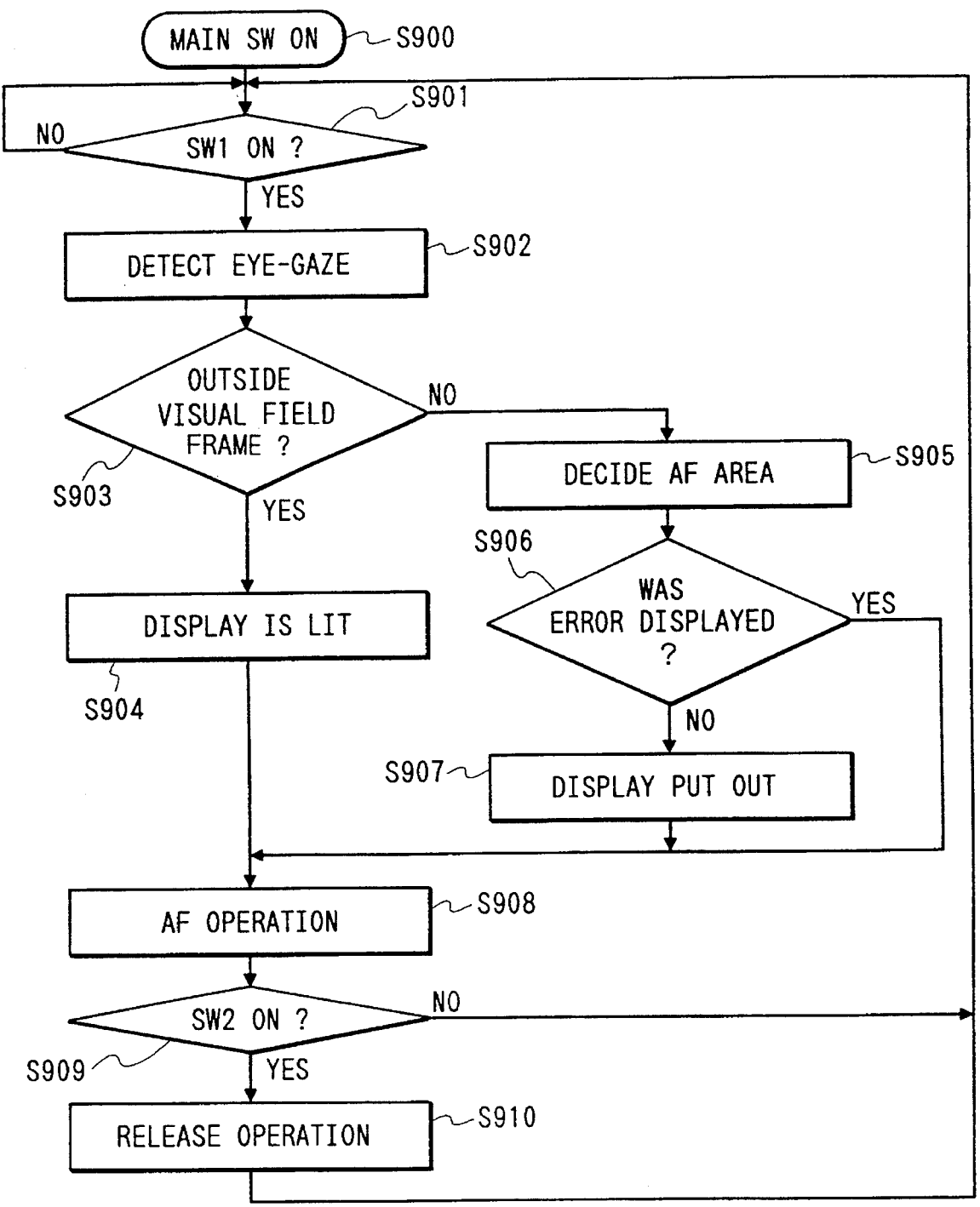

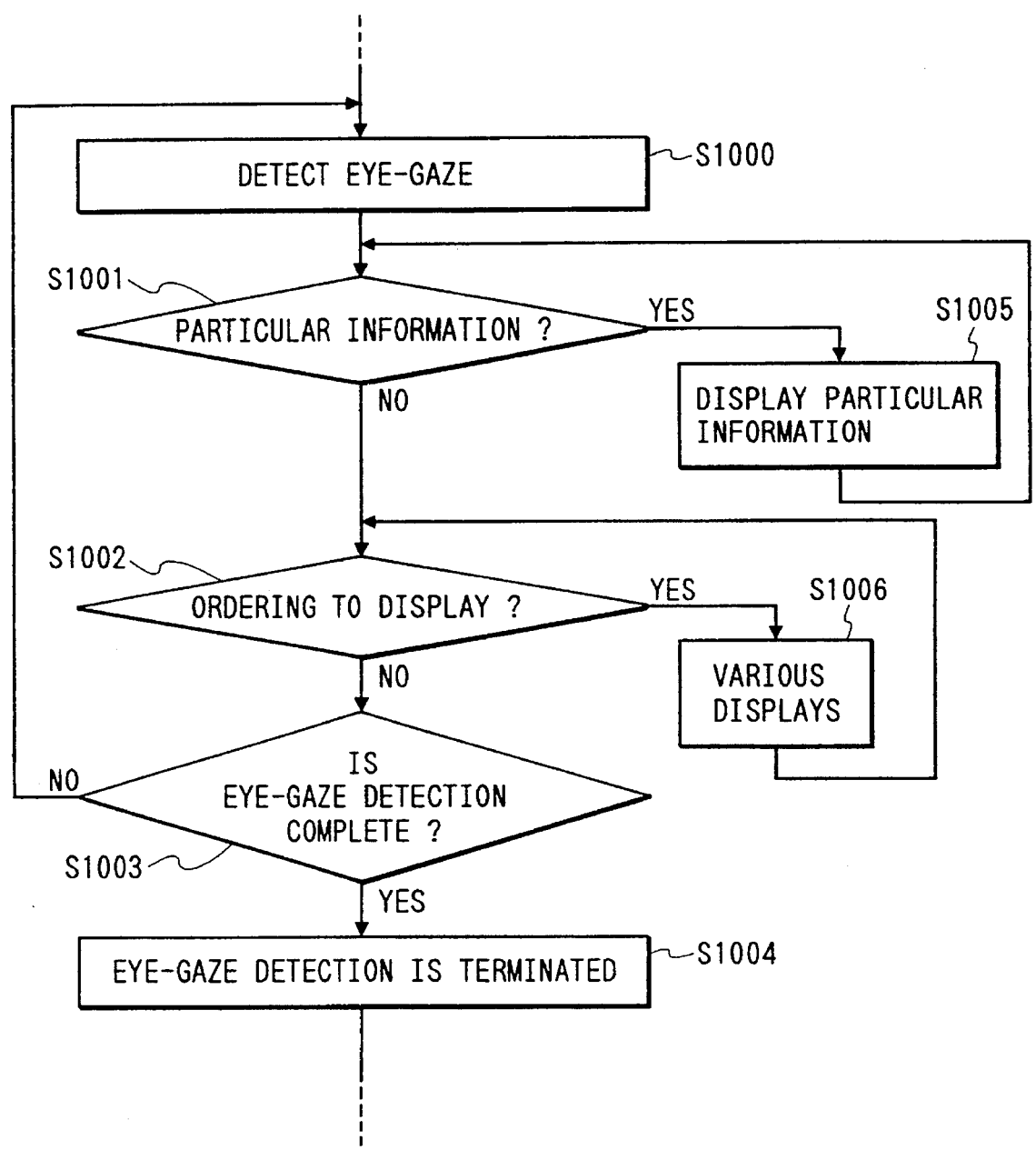

APPARATUS FOR ORDERING TO PHOTOTAKE WITH EYE-DETECTION

This is a continuation of application Ser. No. 08/189,032 filed Jan. 31, 1994, now abandoned, which is a division of application Ser. No. 08/082,736 filed Jun. 28, 1993 (abandoned), which is a division of application Ser. No. 07/774,976 filed Oct. 15, 1991 (now U.S. Pat. No. 5,245,381 issued Sep. 14, 1993), which is a continuation-in-part of application Ser. No. 07/744,496 filed Aug. 14, 1991 (abandoned).

BACKGROUND OF THE INVENTION

1. Field of the Invention

The present invention related to a device for directing a camera operation by detecting operator's eye-gaze direction which is designed to control start, pause or ending of the operation of still cameras or video cameras by detecting the camera operator's eye-gaze direction.

2. Related Background Art

In conventional cameras, a shutter is released when a camera operator depresses a shutter release button mounted on a camera body.

The conventional releasing method of the above-described type has a disadvantage in that camera shake readily occurs in a direction in which the release button is depressed. When the exposure mode is set to, for example, the program mode, the shutter speed is thus automatically set to the lower limit, 1/60 (s), so as to eliminate the above problem.

Also, when the operator releases the shutter with his or her one hand alone, e.g., when the operator handles the camera with his or her right hand while holding a cabled electronic flash or baggage with the left hand, he or she has a difficulty to release the camera.

There is a conventional camera which performs automatic exposure control and automatic focusing control according to luminance information and distance information on a plurality of areas in a photo-taking screen, and this type of camera performs the exposure control and the focusing control on the basis of data obtained in each area. Since such a camera has the reference of the exposure control and the focusing control at the center of the screen, it has a disadvantage that the primary subject must be placed at the center of the screen.

Japanese Patent Laid-Open No. 63-94232 discloses a camera control apparatus wherein the position of the primary subject on a phototaking screen is set by detecting the position of camera operator's eye-gaze, and a weighting circuit calculates optimum exposure and focal point distance for the primary subject from the position. With this camera control apparatus, it is possible to carry out photo-taking operation on a subject at which a camera operator aims as the primary subject at proper exposure and focal point distances.

However, a conventional camera control apparatus has a problem that a release operation can take place even if the exposure and focal point distances are not detected resulting in an inadvertent release operation.

Conventionally, a camera having this type of eye-gaze detecting means has detected the position of operator's eye-gaze in the photo-taking screen by performing distance measurement for each of a plurality of areas or parts in the photo-taking screen and by performing photometry on the photo-taking screen divided into a plurality of parts, thereby selecting a part in the photo-taking screen as the primary subject to perform control of driving of a camera lens and exposure control (e.g., Japanese Patent Laid-Open Nos. 1-241511 and 2-5).

However, since the conventional camera having an eye-gaze detecting means detects a position in the photo-taking screen wherein distance measurement and photometry are performed from the eye-gaze, when the display in the finder changes during the detection of eye-gaze, there is a possibility that the eye-gaze moves to the display and is detected in an inadequate position and, as a result, the photo-taking operation is carried out in a manner which is not intended by the camera operator.

SUMMARY OF THE INVENTION

It is an object of the present invention to provide an apparatus for ordering to photo-take with eye-detection which is capable of directing the operations such as starting photo-taking operation without using hands and with good operability.

It is another object of the present invention to provide a camera which is capable of performing a release operation without depressing a release button and with good operability.

It is another object of the present invention to completely eliminate or minimize camera shakes which can be caused by a operation to release the camera.

It is still another object of the present invention to provide an eye-gaze input camera which can not perform a release operation until camera operator's eye-gaze is detected and photometry and distance measurement is securely carried out on a part which is aimed by the camera operator.

It is still another object of the present invention to provide a camera which is equipped with an eye-gaze detecting means with which the eye-gaze of a camera operator does not move because of display in a finder during detection of the eye-gaze, and thus erroneous detection of an eye-gaze position is avoided.

An apparatus for ordering to photo-take with eye-detection according to the present invention has a configuration as described below. In order to held understanding, reference numerals corresponding to those in embodiments to be described later are used.

A device for directing a camera operation provided in one aspect of the present invention includes eye-gaze direction detection means 3 for detecting the eye-gaze direction of an operator who is looking into a finder, in a predetermined eye-gaze operation area thereof and for outputting an eye-gaze operation signal, and photographic operation direction means (#105 of a CPU 1) for directing the photographic operation, including at least start of a photo-taking operation, in accordance with the eye-gaze operation signal from the eye-gaze direction detection means. With this device, the operation of a camera, such as start of a photo-taking operation, can be directed by detecting the operator's eye-gaze direction.

A device for directing a camera operation provided in another aspect of the present invention includes eye-gaze direction detection means 3 for detecting eye-gaze direction of an operator who is looking into a finder, in a predetermined eye-gaze operation area and for outputting an eye-gaze operation signal, manual operation means 2 for outputting a manual operation signal by a manual operation, mode selection means 5 for making a selection between an eye-gaze operation mode which uses the eye-gaze operation signal and manual operation mode which uses the manual operation signal, and photographic operation direction means (#105 of a CPU 1) for directing the operation of a camera, including at least start of a photo-taking operation, in accordance with the operation signal selected by the mode selection means. With this device, the operation mode is selected between the eye-gaze direction detection mode in which the eye-gaze direction is detected and the manual operation mode, and the operation of a camera, including start of a photo-taking operation, can be directed in accordance with the selected operation mode.

A device for directing a camera operation provided in still another aspect of the present invention includes mode selection control means (#403 of a CPU 1) for switching over the operation mode of the mode selection means from the manual operation mode to the eye-gaze operation mode when a shutter speed is set to a value lower than a predetermined value. With this device, the operation mode can be automatically switched over to the eye-gaze operation mode when the shutter speed is slow.

A device for directing the operation of a camera provided in still another aspect of the present invention includes exposure control means (#303, #304, #306 of the CPU 1) for controlling exposure in accordance with a program diagram in which a shutter speed is slower than in a program diagram used in the manual operation mode when the exposure value is the same if the eye-gaze operation mode is selected by means of the mode selection means. With this device, when the eye-gaze operation mode is selected, exposure control is conducted using a different program diagram.

A device for directing the operation of a camera provided in still another aspect of the present invention includes eye-gaze operation position presetting means (4, #101 to #104 of the CPU 1) which can set an eye-gaze operation position within the finder and which outputs the eye-gaze operation signal when the eye-gaze is directed to the preset eye-gaze operation position. With this device, the eye-gaze operation position is preset, and the operation of a camera, such as starting of a photo-taking operation, can be directed when the eye-gaze is directed to the preset position.

A device for directing the operation of a camera provided in still another aspect of the present invention includes eye-gaze operation position presetting means (#201 to #212 of the CPU 1) which can set a plurality of eye-gaze operating positions within the finder and which outputs the eye-gaze operation signal when the eye-gaze sequentially is directed to the preset eye-gaze operation positions. With this device, the plurality of eye-gaze operation positions are preset, and the operation of a camera, such as starting of a photo-taking operation, can be directed when the eye-gaze sequentially is directed to the preset positions.

A device for directing the operation of a camera provided in still another aspect of the present invention includes display control means (#501 to #504 of the CPU 1) for prohibiting display of the eye-gaze operating position when the photo-taking operation is impossible. With this device, the eye-gaze operating position can be displayed only when the photo-taking operation is possible.

An eye-gaze detection operation type camera according to the present invention is equipped with a finder means for observing subjects, an eye-gaze detecting means for detecting the eye-gaze of an operator who is looking into the finder, a movement detecting means for detecting movement of the eye-gaze from a first predetermined area to a second predetermined area passing through a predetermined movement area in the visual field of the finder means and for outputting a control signal, and a release means for releasing the camera according to the control signal.

Further, an eye-gaze detection operation type camera according to the present invention is equipped with a finder means for observing subjects, an eye-gaze detecting means for detecting the eye-gaze of an operator who is looking into the finder, a movement detecting means for detecting movement of the eye-gaze which has stayed at a point in a first predetermined area or in the vicinity thereof for a predetermined period of time, to a second predetermined area, in the visual field of the finder, within a predetermined range of angle direction, and for outputting a control signal, and a release means for releasing the camera according to the control signal.

In an eye-gaze detection operation type camera according to the present invention, when the eye-gaze of a camera operator who is looking into the finder means moves from a first predetermined area to a second predetermined area through a predetermined movement area, the movement detecting means outputs a control signal. The release means releases the camera according to the control signal. In other words, the operation of releasing the camera is carried out without depressing a release button.

In an eye-gaze detection operation type camera according to the present invention, when the eye-gaze of a camera operator who is looking into the finder means, which has stayed at a point in a first predetermined area or in the vicinity thereof for a predetermined period of time, moves to a second predetermined area, within a predetermined range of angle direction, the movement detecting means outputs a control signal.

The release means releases the camera according to the control signal. Specifically, the operation of releasing the camera is carried out when a camera operator observes a point in subjects or the vicinity thereof, in the visual field of the finder means for a predetermined period of time or longer, and then moves the eye-gaze to a second predetermined area in a predetermined angle direction. In other words, the release operation is carried out by moving the eye-gaze after gazing subjects, and photo-taking operation is carried out without depressing a release button with the procedure according to the conventional photo-taking operation.

An eye-gaze input camera according to the present invention is an eye-gaze input camera comprising an eye-gaze detecting means for detecting the eye-gaze of a camera operator who is looking into a camera finder, a camera control means for controlling the operation of the camera according to an eye-gaze detection signal from the eye-gaze detecting means, and a release means for ordering to start photo-taking operation of the camera, which has a configuration including a release prohibiting means for prohibiting the release means from ordering to start photo-taking operation when there is no eye-gaze detection signal from the eye-gaze detecting means.

According to the present invention, the release prohibiting means prohibits an release operation so that start of photo-taking operation is not ordered when the eye-gaze detecting means can not detect an eye-gaze of a camera operator and, as a result, an inadvertent release operation is avoided and a photo-taking operation will not take place when exposure or focusing is made in a position which is not aimed by the camera operator.

A camera having an eye-gaze detecting means according to the present invention comprises first– seventh solving means as described below. A first solving means has a configuration including an eye-gaze detecting means characterized in that, in a camera having an eye-gaze detecting means including an eye-gaze detecting means for detecting the position of an eye-gaze of a camera operator looking into a finder, and a display means for displaying in the finder, it is equipped with a display control means for controlling so that the display with the display means is carried out in an inconspicuous manner when the eye-gaze detecting means is detecting an eye-gaze.

A second solving means a configuration wherein the display control means puts out the display with the display means when the eye-gaze detecting means is detecting an eye-gaze.

A third solving means has a configuration wherein the display control means fixes the display with the display means when the eye-gaze detecting means is detecting an eye-gaze.

A fourth solving means has a configuration wherein the display control means decreases the luminance of the display with the display means when the eye-gaze detecting means is detecting an eye-gaze.

A fifth solving means has a configuration wherein the display control means causes the display to be made in an original form when the display means makes an error display even when the eye-gaze detecting means is detecting an eye-gaze.

A sixth solving means has a configuration wherein, in a camera having an eye-gaze detecting means comprising an eye-gaze detecting means for detecting an eye-gaze of a camera operator looking into a finder and a display means for displaying in the finder, a display control means is provided, which causes the display means to display when a position detected by the eye-gaze detecting means is out of a visual field frame.

A seventh solving means has a configuration wherein the display control means causes the display means to make an error display when the display means makes an error display even when a position detected by the eye-gaze detecting means is out of the visual field frame.

According to the present invention, when an eye-gaze detecting operation is being carried out, the display in a finder is made in an inconspicuous manner by putting out or fixing the display or by decreasing the luminance of the display, otherwise, the display is made only while the eye-gaze of the camera operator is directed to the outside of the visual field frame. As a result, the camera operator's eye-gaze will not be stimulated to move, by the display in the finder. Further, since the display is made even when the eye-gaze detection is being conducted if it is an error display, no photo-taking operation will be carried out with serious failures in distance measurement and photometry.

BRIEF DESCRIPTION OF THE DRAWINGS

FIGS. 26 and 27 are flow charts of the operation of two different embodiments of the camera of the invention equipped with an eye-gaze detection means.

DETAILED DESCRIPTION OF THE PREFERRED EMBODIMENTS

Embodiments of the present invention will be described below with reference to the accompanying drawings.

Figure 1:
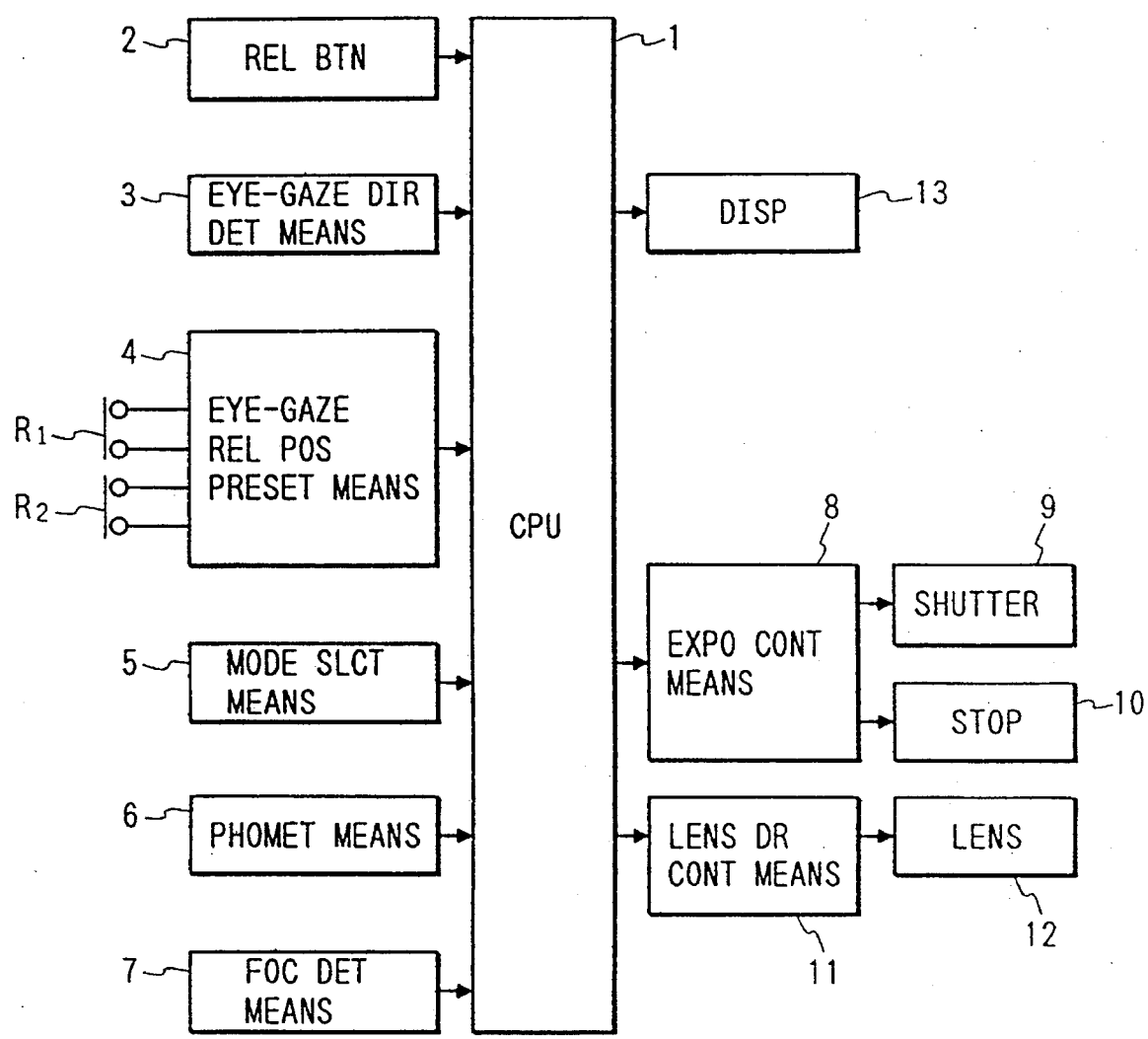
FIG. 1 is a block diagram of a first embodiment of a device for directing a camera operation by detecting operator's eye-gaze direction according to the present invention.
Figure 2:
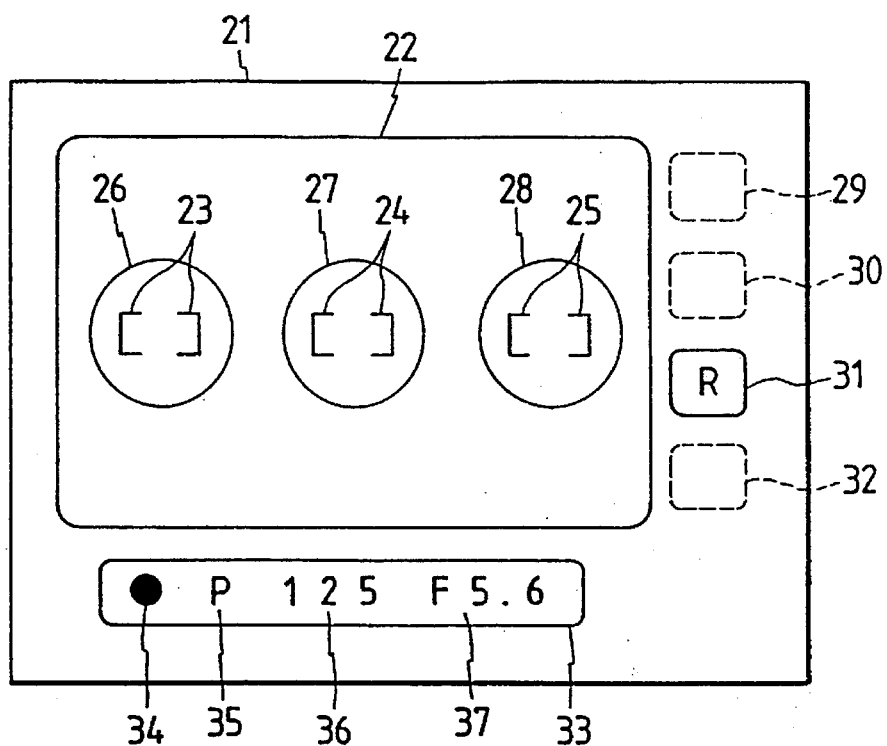
FIG. 2 is a view of a finder of the first embodiment.
Figure 3:
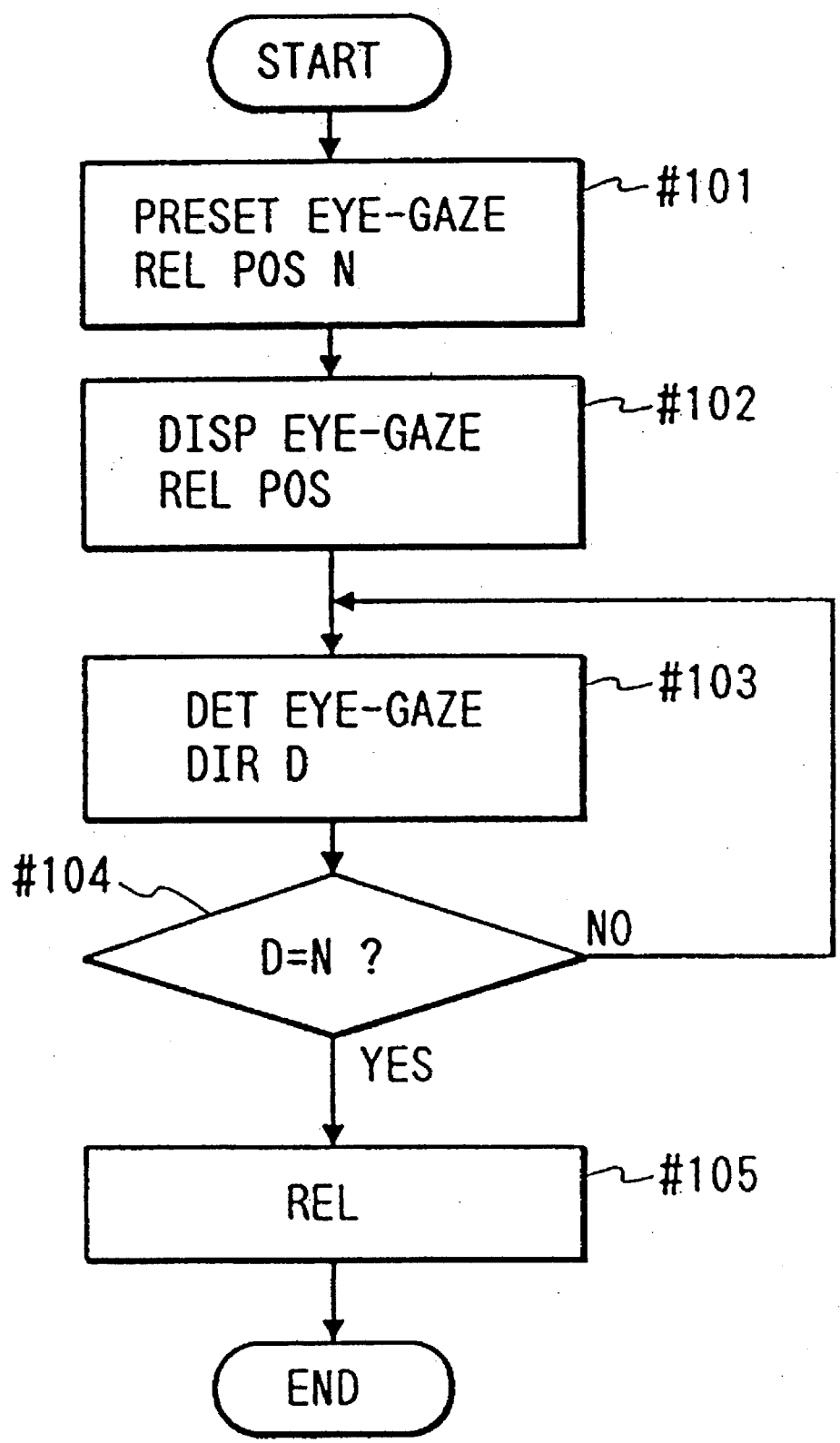
FIG. 3 is a flowchart showing the operation of a CPU of the first embodiment.

A first embodiment of a device for directing the operation of a camera according to the present invention will be described first with reference to FIGS. 1 to 3. FIG. 1 is a block diagram of the first embodiment, FIG. 2 is a view of a finder, and FIG. 3 is a flowchart of the operation of a CPU.

A CPU 1, which is a central control unit for controlling the entire system, receives an output signal from a release button 2, eye-gaze direction detection device 3, eye-gaze releasing position presetting device 4, mode selection device 5, photometering device 6, and focal point detection device 7.

The release button 2 release a camera.

The eye-gaze direction detection device 3 detects photographer's eye-gaze direction within a finder. An eye-gaze direction detection device 3 of the type which illuminates an infrared radiation to an observer's eyeball and detects the eye-gaze point from a reflected image from the eyeball (disclosed in Japanese Patent Laid-Open No. 1-274736) can be used.

The eye-gazing releasing position presetting device 4 presets a predetermined eye-gaze releasing position (eye-gaze operation position) within the finder. When photographer's eye-gaze is directed to the preset eye-gaze releasing position, the camera is released. At least one eye-gaze releasing position is provided. The positions to be set can be selected using switches provided on the outer side of the camera body.

The mode selection device 5 makes a selection between a button releasing mode (manual operation mode) by means of a releasing button 2 and an eye-gaze releasing node (eye-gaze operation mode) by means of the eye-gaze direction detection device 3.

The photometering device 6 measures the luminance of a field, and the focal point detection device 7 detects the focal point of an object.

The output of the CPU 1 is connected to exposure control device 8, lens drive control device 11, and display device 13.

The exposure control device 8 controls the shutter speed of a shutter 9 and the aperture of a stop 10 in accordance with the exposure operated by the CPU 1 on the basis of the measured value of the photometering device 6.

The lens drive control device 11 controls the drive of a photographic lens 12 in accordance with a focusing lens movement operated using the focal point detected by the focal point detection device 7 by the CPU 1.

The display device 13 performs various displays within the finder frame (see FIGS. 2 and 4) and on the outer side of the camera body.

As shown in FIG. 2, a visual field frame 22 is provided within a finder frame 21. Four eye-gaze releasing positions 29 to 32 are provided on the right side of the visual field frame 22. Below the visual field frame 22 is provided a display frame 33 which includes a focusing mark display 34, an exposure mode display 35 for displaying either P (programmed), A (aperture priority), S (shutter speed priority), and M (manual), a shutter speed display 36 for displaying a shutter speed, and an F number display 37 for displaying the F number.

In the example shown in FIG. 2, the eye-gaze releasing position 31 is selected, the P mode is selected as the exposure mode, and a shutter speed of 1/125 (s) and an F number of F5.6 are displayed.

The operation of the first embodiment will be described with reference to FIG. 3.

First, an eye-gaze releasing position presetting signal N is output to the CPU 1 (#101) by presetting the third eye-gaze releasing position 31 using the eye-gaze releasing position presetting device 4, and "R" is thereby displayed on the eye-gaze releasing position 31 (#102), as shown in FIG. 2.

Next, the eye-gaze direction detection device 3 starts detecting the observer's eye-gaze direction, and then outputs an eye-gaze direction detection signal D (#103).

The CPU 1 compares the eye-gaze releasing position presetting signal N preset in step #101 with the eye-gaze direction detection signal D detected in step #103 (#104), and releases the camera if they coincide with each other (#105). If they do not coincide with each other, the process returns to step #103.

Figure 4:
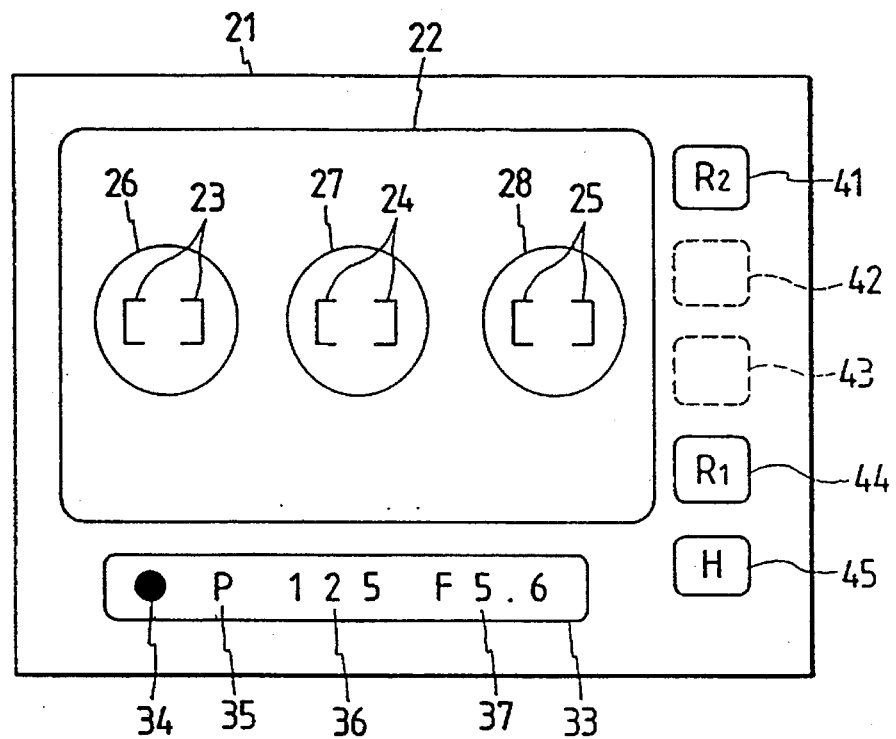
FIG. 4 is a view of a finder of a second embodiment of the present invention.
Figure 5:
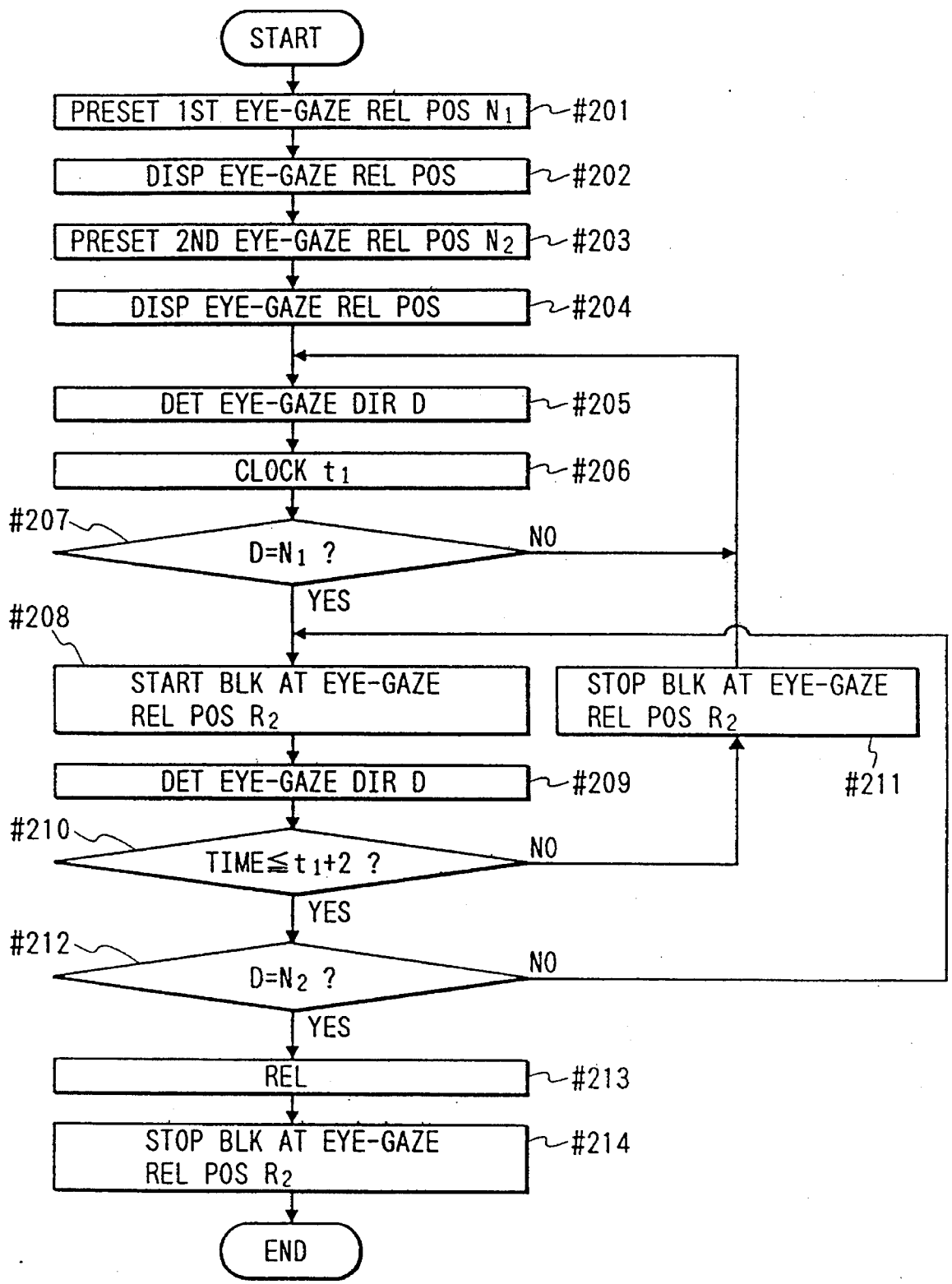
FIG. 5 is a flowchart showing the operation of the CPU of the second embodiment.

A second embodiment of a device for directing the operation of a camera by detecting operator's eye-gaze direction according to the present invention will be described with reference to FIGS. 4 and 5. FIG. 4 is a view of a finder, and FIG. 5 is a flowchart of the operation of the CPU.

It is to be noted that the same reference numerals are used to denote parts which are the same as those of the first embodiment, description thereof being omitted. In the second embodiment, eye-gaze releasing positions 41 to 44 are provided, as shown in FIG. 4, and two eye-gaze releasing positions are selected. In the example shown in FIG. 4, the releasing positions 41 and 44 are selected, and "$R_1$" and "$R_2$" are thus displayed. The camera is released when it is detected that photographer's eye-gaze is directed first to the eye-gaze releasing position 41 and then to the eye-gaze releasing position 44 within a predetermined period of time.

The operation of the second embodiment will be described with reference to FIG. 5.

An eye-gaze releasing position first preset signal $N_1$ is output to the CPU 1 (#201) by presetting the lowermost eye-gaze releasing position 44 using the eye-gaze releasing position presetting device 4, and "$R_1$" is displayed at the eye-gaze releasing position 44 (# 202), as shown in FIG. 4.

Similarly, an eye-gaze releasing position second preset signal $N_2$ is output to the CPU 1 (#203) by presetting the uppermost eye-gaze releasing position 41, and "$R_2$" is thereby displayed at the eye-gaze releasing position 41 (#204).

Next, the eye-gaze direction detection device 3 starts detecting observer's eye-gaze direction, and then outputs an eye-gaze direction detection signal D (#205). A time $t_1$ at which this detection is made is counted (#206).

The CPU 1 compares the eye-gaze releasing position first preset signal $N_1$ preset in step #201 with the eye-gaze detection signal D detected in step #205 (#207), and starts blinking the eye-gaze releasing position $R_2$ if they coincide with each other (#208). If they do not coincide with each other, the process returns to step #205 (#207).

Next, the eye-gaze direction detection device 3 starts detecting observer's eye-gaze direction, and outputs an eye-gaze direction detection signal D (#209).

If the time at which this detection is made is within a predetermined period of time (two seconds) after the time $t_1$ clocked in step #206, i.e., after the time at which $D=N_1$ has established, the process goes to step #212. If the time at which this detection is made exceeds the predetermined time, blinking of the eye-gaze releasing position $R_2$ is stopped (#211), and the process returns to step #205.

The CPU 1 compares the eye-gaze releasing position second preset signal $N_2$ preset in step #203 with the detection signal D detected in step #209 (#212), and releases the camera (#213) and then pauses blinking the eye-gaze releasing position $R_2$ (#214) if they coincide with each other. If D is not equal to $N_2$, the process returns to step #208.

In this embodiment, since presetting is made in two stages, even if the eye-gaze is erroneously directed to the eye-gaze releasing position, the camera is not erroneously released. Furthermore, the eye-gaze releasing position blinks when releasing is possible, and blinking stops when the releasable time has passed or when releasing is ended. Consequently, releasing is facilitated.

Figure 6:
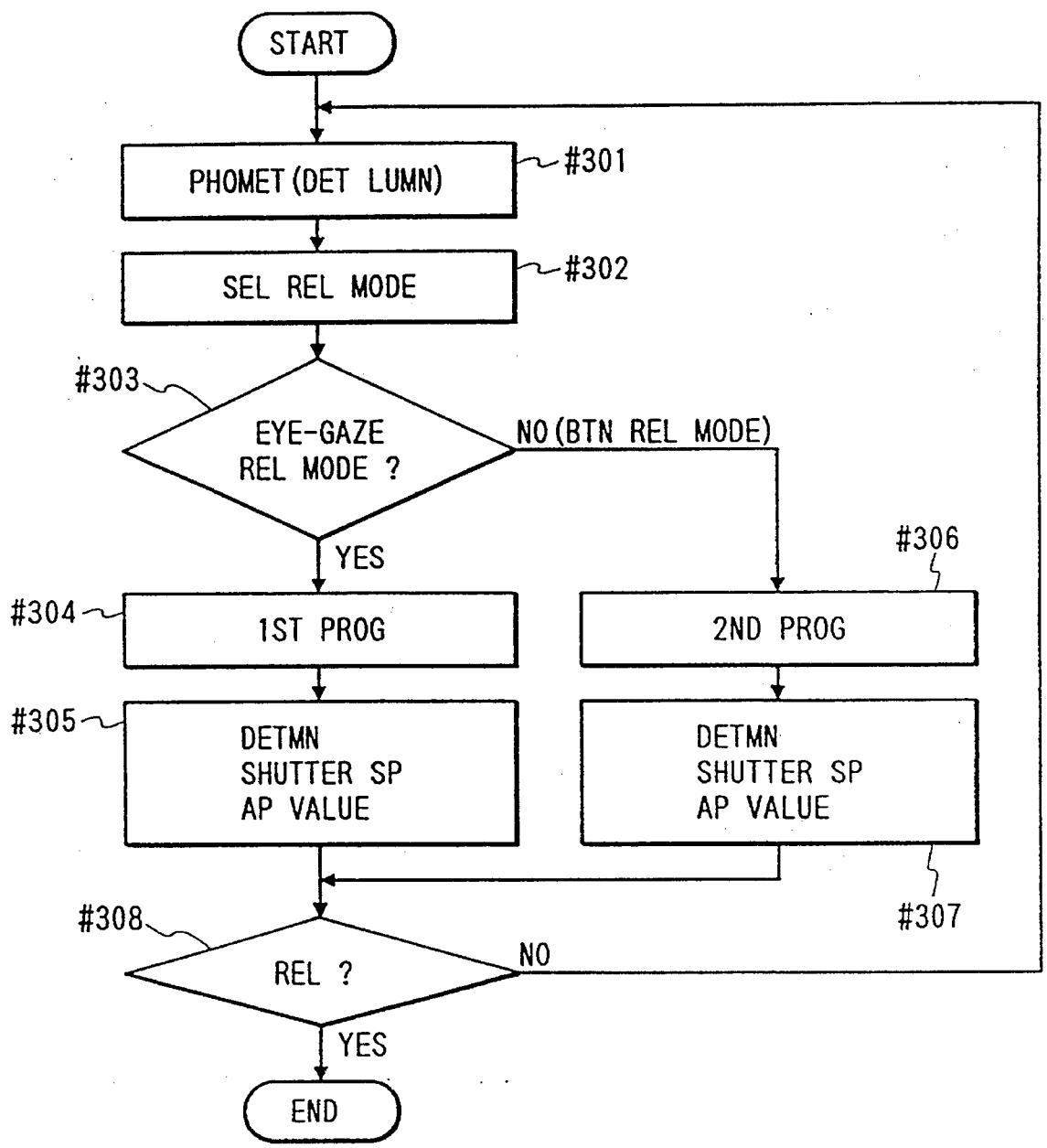
FIG. 6 is a flowchart showing the operation of the CPU in a third embodiment of the present invention.
Figure 7:
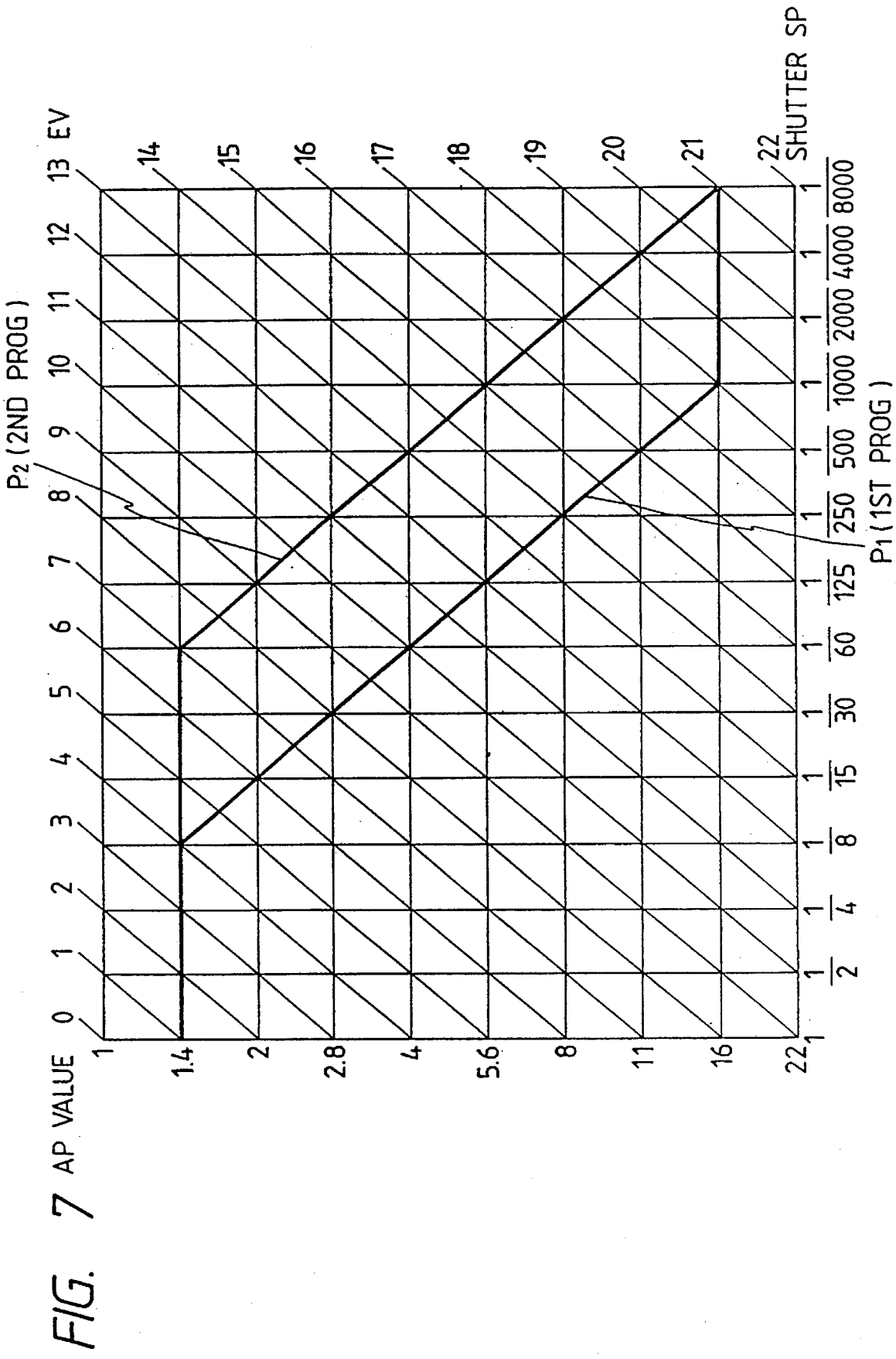
FIG. 7 is a program diagram used for exposure control in the third embodiment.

A third embodiment of a device for directing the operation of a camera by detecting operator's eye-gaze direction according to the present invention will be described with reference to FIGS. 6 and 7. FIG. 6 is a flowchart showing the operation of a CPU, and FIG. 7 is a program diagram used for exposure control.

In this embodiment, different program diagrams are used for exposure control. The program diagram is determined by a selected release mode.

First, luminance detection is conducted by the photometering device 6 (#301).

When the release mode selected by the mode selection device 5 is input (#302), it is determined whether or not the release mode is an eye-gaze release mode (#303). If it is determined that the release mode is the eye-gaze release mode, a first program $P_1$ shown in FIG. 7 is selected (#304), and then the shutter speed and the F number are determined in accordance with the selected first program $P_1$ (#305).

If the eye-gaze release mode is not selected, a second program $P_2$ shown in FIG. 7 is selected (#306), and the shutter speed and the F number are determined in accordance with the selected second program $P_2$ (#307).

In the first program $P_1$, the shutter speed relative to the same EV value is slower in (FIG. 7) than in the second program $P_2$.

Thereafter, the camera is released by means of the release button or by the detection of the eye-gaze direction, as in the case of the first and second embodiments, on the basis of the shutter speed and F number determined in step #305 to step #307 (#308).

In the eye-gaze release mode, since the camera shake is less, a program in which a shutter speed is slower can be used for exposure control. Consequently, the aperture is narrowed, and the depth of field is thus increased.

Figure 8:
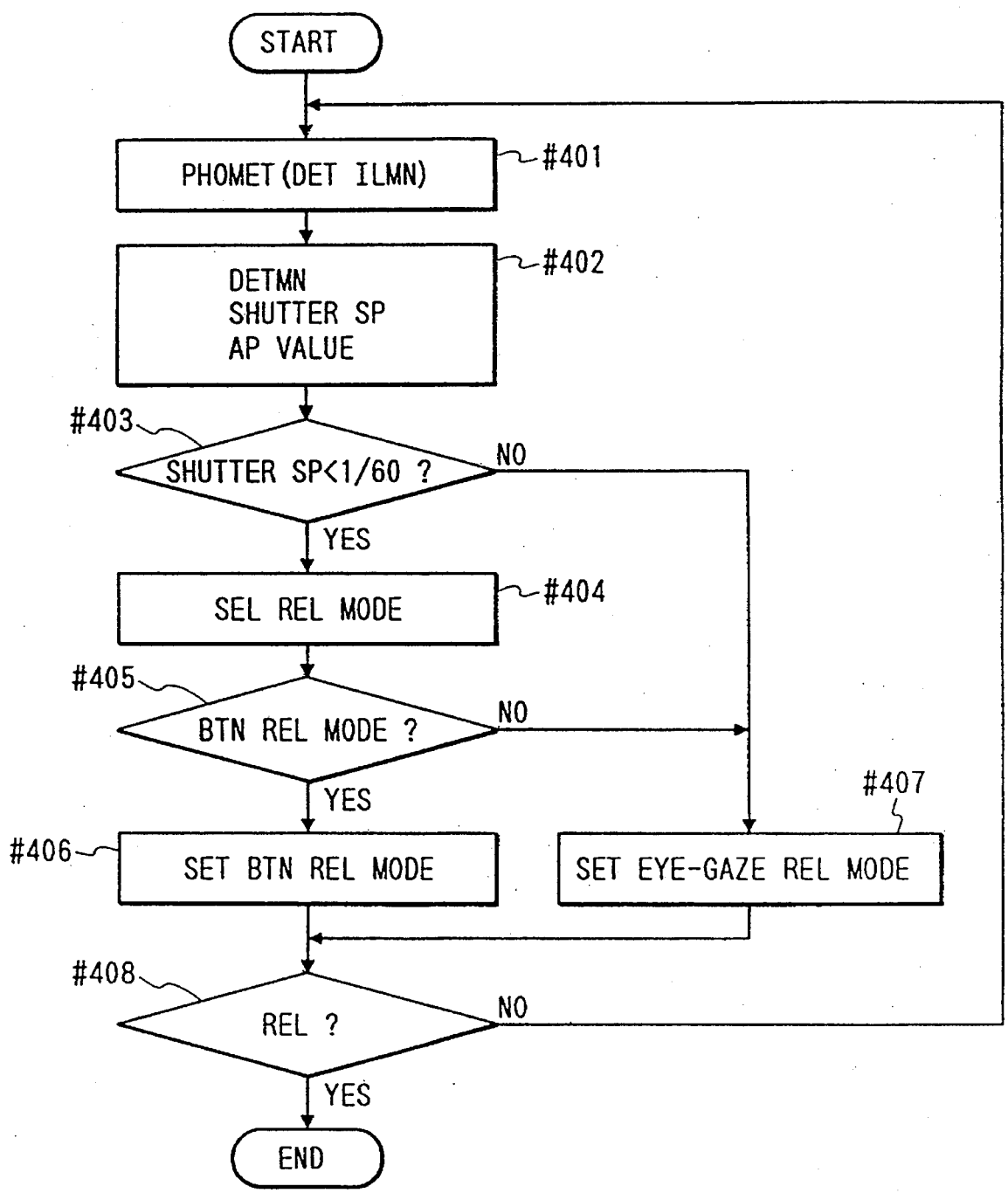
FIG. 8 is a flowchart showing the operation of the CPU in a fourth embodiment of the present invention.

FIG. 8 is a flowchart showing the operation of a CPU used in a fourth embodiment of the device for directing the operation of a camera according to the present invention.

In this fourth embodiment, when the shutter speed is decreased to a predetermined value or less during the exposure control, the eye-gaze direction detection mode is automatically selected.

Photometering is conducted by means of the photometering device 6 (#401), and then the shutter speed and F number are determined in accordance with a predetermined program diagram (#402).

It is determined whether or not the shutter speed is faster than a predetermined value (1/60 sec in this embodiment) (#403). If the shutter speed is faster than the predetermined value, a mode signal from the mode selection means 5 is detected (#404), and then it is determined whether or not the release mode is the button release mode (#405). If the button release mode is selected, the button release mode is set (#406).

If it is determined in step #403 that the shutter speed is 1/60 sec or less, or even if it is determined that the shutter speed is faster than 1/60 sec, if it is determined in step #405 that the button release mode is not selected, the eye-gaze release mode is set (#407).

The release signal is awaited and the camera is released in the corresponding mode (#408).

In this embodiment, when the shutter speed is slower than the predetermined value, the eye-gaze release mode is automatically selected. Consequently, generation of camera shake is lessened.

Figure 9:
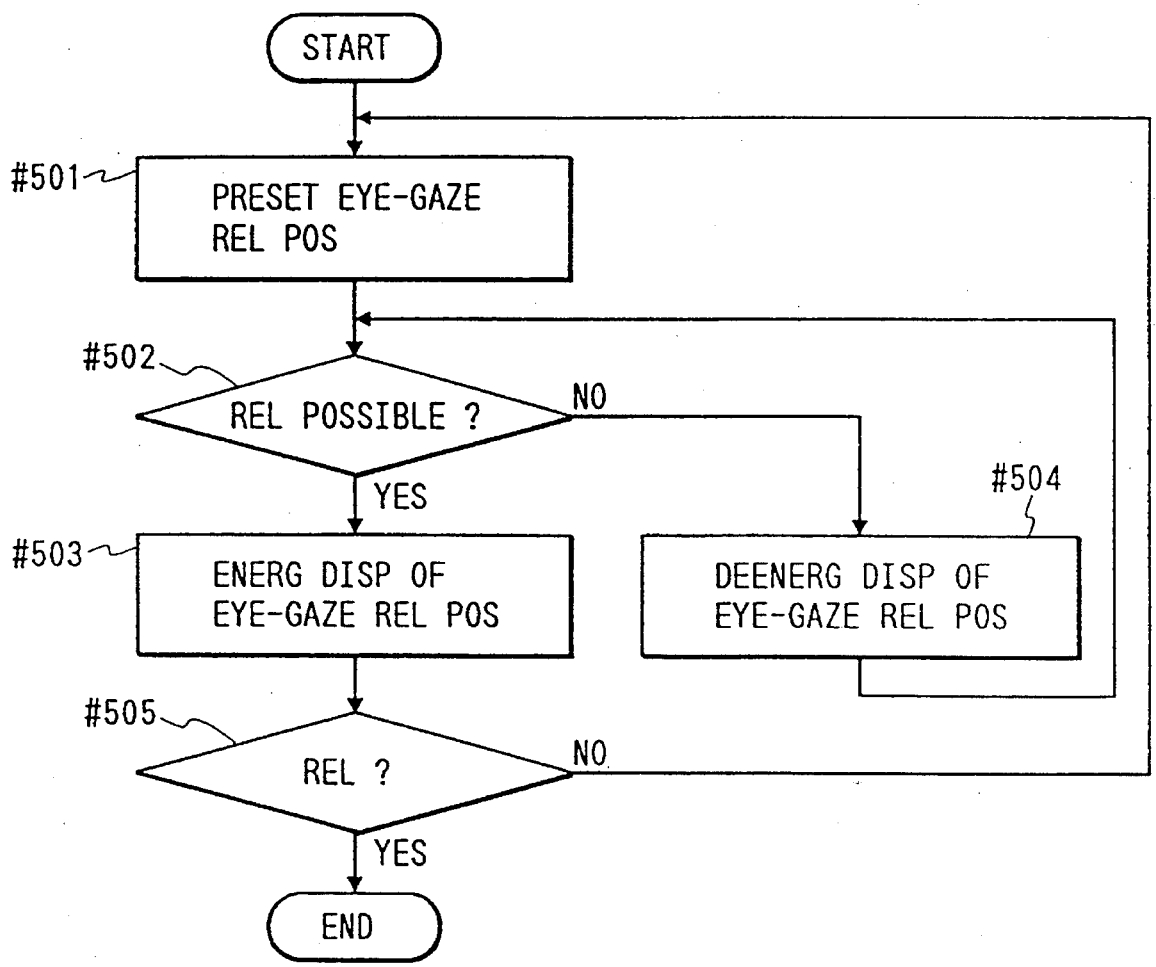
FIG. 9 is a flowchart showing the operation of the CPU in a fifth embodiment of the present invention.

FIG. 9 is a flowchart showing the operation of a CPU used in a fifth embodiment of a device for directing the operation of a camera according to the present invention.

In this embodiment, when the eye-gaze release is conducted, the release position is displayed only when releasing is possible in the sequence of camera operations, e.g., only after the film has been wound up or after focusing is completed.

When the eye-gaze release position is preset by means of the eye-gaze release position presetting device 4 (#501), the CPU 1 determines whether or not eye-gaze release is possible at the present stage of the camera operation (#502).

If eye-gaze release is possible, the eye-gaze releasing position is displayed within the finder (#503). If eye-gaze release is not possible, the eye-gaze release position is not displayed within the finder (#504).

When it is detected that the eye-gaze is directed to the eye-gaze release position, the camera is released (#505).

In this embodiment, camera release without winding the film can be avoided. Consequently, a shutter release moment can be effectively utilized.

While the preferred embodiments have been described, it is to be understood that variations thereto will occur to those skilled in the art within the scope of the present invention concepts.

If it is desired to provide a release button half depressing function, e.g., starting of various displays, battery check or focus locking, an eye-gaze half operating positions 45 (see FIG. 4) is provided., and that function is operated by detecting operator's eye-gaze direction in the same manner as in the afore-mentioned embodiments.

Furthermore, since camera release by detection of the eye-gaze direction in a state in which the releasing button is depressed is possible, the camera may be made released by detecting the eye-gaze direction in that state.

In the case of a video camera, the operation of the camera may include start, pause, restarting and ending of the phototaking operation. In the case of a still camera, series photography may be conducted.

The camera operation directing device according to the present invention has the following advantages.

According to one aspect of the present invention, since start of the operation of a camera can be directed by detecting operator's eye-gaze direction, camera shake generated in a still camera by the depression of a releasing button can be completely eliminated. Furthermore, even when the camera must be handled with one hand, it can be easily handled to take pictures.

According to the second aspect of the present invention, since a selection is made between the eye-gaze direction detection mode and the manual operation mode, a releasing method which ensures an easy operation can be selected in accordance with the status of the camera operation.

According to the third aspect of the present invention, when the shutter speed becomes a predetermined value or less, the eye-gaze direction detection mode is automatically selected. Consequently, camera shake can be reliably prevented.

According to the fourth aspect of the present invention, when the eye-gaze operation mode is selected, a program diagram which assures a shutter speed lower than that in the manual operation mode is used. Consequently, the shutter speed can be decreased, and the depth of field can thus be increased.

According to the fifth aspect of the present invention, since the eye-gaze operation position is preset, erroneous eye-gaze operation can be eliminated.

According to the sixth aspect of the present invention, a plurality of eye-gaze operating positions are set, and the operation of a camera, such as starting of a photo-taking operation, can be directed when operator's eye-gaze is sequentially directed to these positions. Consequently, even when the operator's eye-gaze enters the eye-gaze operation position by mistake, erroneous operation can be eliminated.

According to the seventh aspect of the present invention, since the eye-gaze operating position is displayed only when the photo-taking operation is possible, it is possible to prevent to conduct a useless eye-gaze operation when the photo-taking operation is impossible.

Figure 10:
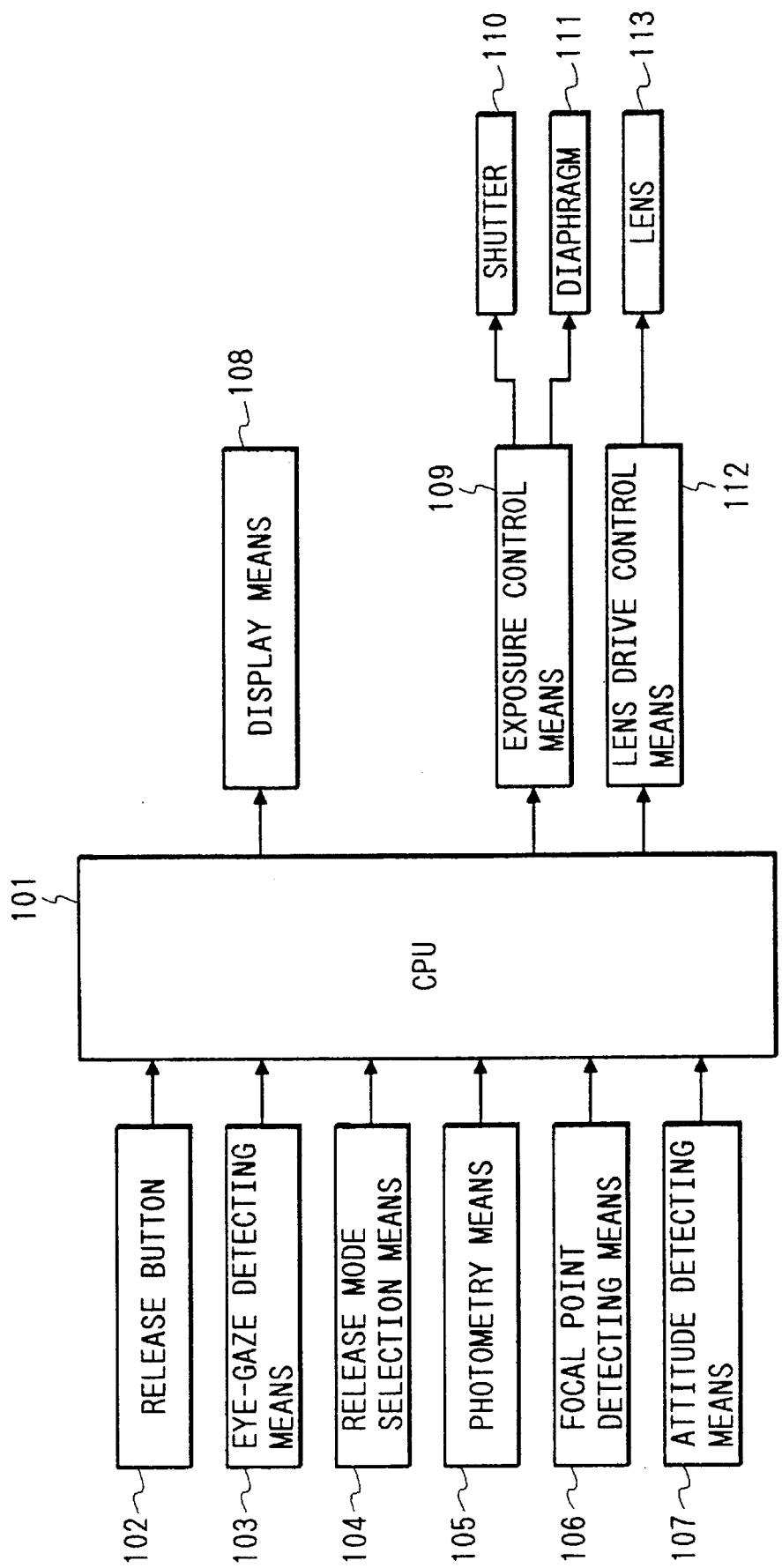
FIG. 10 is a block diagram schematically showing the construction of an eye-gaze detection operation type camera in accordance with the present invention.

Other embodiments of the present invention will now be described with reference to the drawings. FIG. 10 is a block diagram schematically showing the configuration of an eye-gaze detection operation type camera according to an embodiment of the present invention. The apparatus shown in this figure is equipped with a CPU (central processing unit) 101, a release button 102, and an eye-gaze detecting device 103, a release mode selecting device 104, a photometry device 105, a focal point detecting device 106, and an attitude detecting device 107 which are connected to the CPU 101 through an input/output interface circuit which is not shown. Further, a display device 108, an exposure control device 109 with a shutter device 110 and a diaphragm device 111 connected thereto, a lens drive control device 112 and a lens 113 driven by the same, are connected to the CPU 101 through an input/output interface circuit which is not shown.

The CPU 101 is constituted by a microprocessor, for example, and controls the overall system operation of the camera and, in practice, a ROM for storing programs and data, a RAM which stores temporary data and are used as a working area, and the like, are incorporated in or connected to the CPU 101. The release button 102 is well known push-button for releasing the camera. The eye-gaze detecting device 103 is a device as disclosed in the aforesaid patent publications, which detects a point in the finder to which an eye-gaze of a camera operator is directed. The release mode selecting device 104 is a device, e.g. a switch, for selection by a camera operator between a mode wherein a release operation is performed by means of the release button 102 and a mode wherein a release operation is performed detecting an eye-gaze. The photometry device 105 may be a well known device for measuring the luminance if a field to be photo-taken. The focal point detecting device 106 may be a well known device for detecting the position of the focal point of a subject. The attitude detecting device 107 is a device for detecting the attitude of a camera, e.g., the vertical and horizontal positions, and may be a known type. The display device 108 is a device constituted by a light-emitting diode and the like, which displays, in a finder, information such as an eye-gaze release position, "in or out of focus" information, an exposure control mode, a shutter speed, and an aperture value. The exposure control device 109 is a well known device which controls the shutter 110 and the diaphragm 111 according to an exposure value which is measured by the photometry device 105 and calculated by the CPU 101. The shutter device 110 is a well known device which is controlled by the exposure control device 109. The diaphragm device 111 may be a well known device which is also controlled by the exposure control device. The lens drive control device 112 is a device for controlling the lens 113 with respect to the position of a focal point detected by the focal point detecting device 106 in accordance with the quantity of movement of a focusing lens calculated by the CPU 101. The lens 113 is a well known photo-taking lens.

Figure 11:
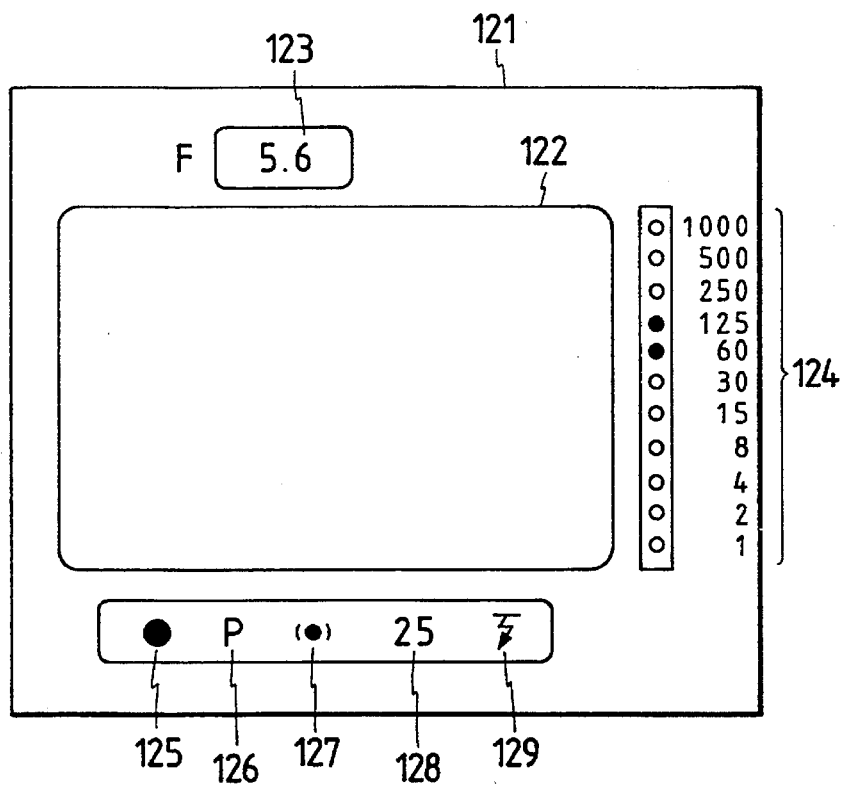
FIG. 11 is an illustration of a sight in a viewing finder in a camera in accordance with the present invention.

FIG. 11 shows the inside of a finder of an eye-gaze detection operation type camera according to the present invention. In this figure, numeral 121 represents a finder frame in which a visual field frame 122 is disposed. In the upper portion of the visual field frame 122, an aperture value display portion 123 wherein an aperture value for the photo-taking lens is displayed, is provided. In FIG. 11, F5.6 is displayed. A shutter speed display portion 124 wherein a shutter speed is displayed, is provided on the right side of the visual field frame 122. This figure illustrates a case wherein the shutter speed is in the range between $\frac{1}{60}$ (S) and $\frac{1}{125}$ (S). For example, an "In-focus" mark 125, an exposure mode display portion 126, a photometry mode display portion 127, a number-of-frame display portion 128, and a flash device usage recommendation display portion 129 are provided under the visual field frame 122. The "In-focus" mark 125 illuminates, for example, when focusing has been carried out. In the exposure mode display portion 126, P (program), A (aperture priority), S (shutter priority), M (manual), and the like, are displayed in accordance with an exposure mode which has been selected. FIG. 11 shows the display for a case wherein the P mode has been selected. Display of modes such as multi-photometry, center-emphasized photometry, spot photometry is shown in the photometry mode display portion 127. FIG. 11 shows a case wherein the center-emphasized photometry mode has been selected. The number-of-frame display portion 128 displays the number of frames of recording media such as a film. FIG. 11 shows that the next photo-taking operation will be carried out on the twenty-fifth frame. The flash device usage recommendation display portion 129 is displayed recommending use of a flash device such as a strobe device.

Figure 12:
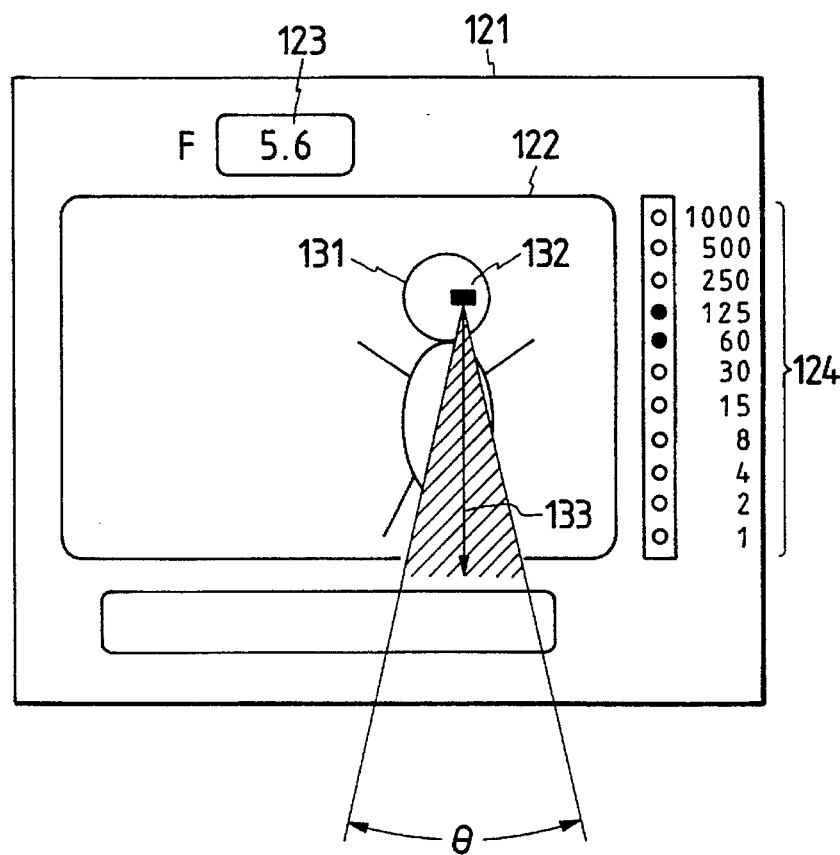
FIG. 12 is an illustration of a sight in a viewing finder in a camera of the invention as viewed when the camera is held in horizontal position.

Description will not be made on how to perform a release operation with an eye-gaze detection operation type camera having the configuration as described above. First a case wherein the camera is held in horizontally will be described with reference to FIG. 12. In FIG. 12, parts identical to those in FIG. 11 are indicated by the same reference numerals as in FIG. 11 and description will be omitted for them.

In this case, since the camera is held horizontally, all the displays under the visual field frame 122 (125, 126, 127, 128, and 129 in FIG. 11) have been put out.

A camera operator gazes into a portion 132 of a primary subject 131 in the visual field frame, and then he moves his eye-gaze towards the outside of the visual field frame as indicated by the arrow 133 within a predetermined range of angle θ (e.g., θ = 30 degrees) rotated in the vertical direction. This movement of the eye-gaze is detected by the eye-gaze detecting device 103 (FIG. 10) and the CPU 101 determines whether the movement satisfies or not predetermined conditions to be described later. If the conditions are satisfied, the CPU 101 causes the exposure control device 109 to carry out release operations such as the operation of the shutter device 110. Specifically, the camera is released at a point in time when the eye-gaze crosses the visual field frame 122.

Figure 13:
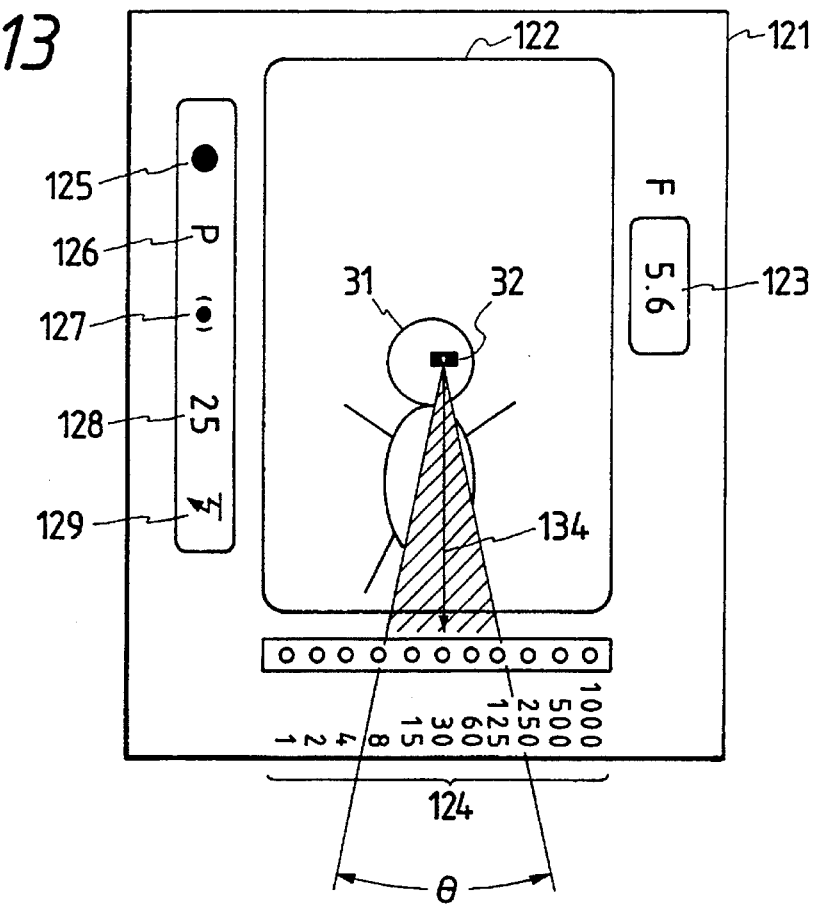
FIG. 13 is an illustration of a sight in a viewing finder in a camera of the invention when the camera is held in vertical position.

FIG. 13 is a conceptual diagram showing the operation according to the present invention in the case of holding a camera vertically. Parts identical to those in FIG. 11 and FIG. 12 are indicated by the same reference numerals as in FIG. 11 and FIG. 12, and description will be omitted for them.

In this case, since the camera is held vertically all the display under the visual field frame 122 (124 in FIG. 11) have been put out.

In this case, a camera operator gazes into a portion 132 of a primary subject 131 in the visual field frame, and then he moves his eye-gaze towards the outside of the visual field frame as indicated by the arrow 134 within a predetermined range of angle θ (e.g., θ= 30 degrees) rotated in the vertical direction. Thus, the camera is released at a point in time when the eye-gaze crosses the visual field frame 122, just as described above.

The reason for putting out the displays in the direction of the eye-gaze release operation as described above is to prevent an inadvertent release operation which is caused, if the display exists, by the nature of human eyes to chase something which has changed when the contents and the like of the display have changed. It is convenient to allow a camera operator to select this function of putting out displays with of an operational switch. Further, the displays may be darkened slightly to be inconspicuous instead of putting out them.

Figure 14:
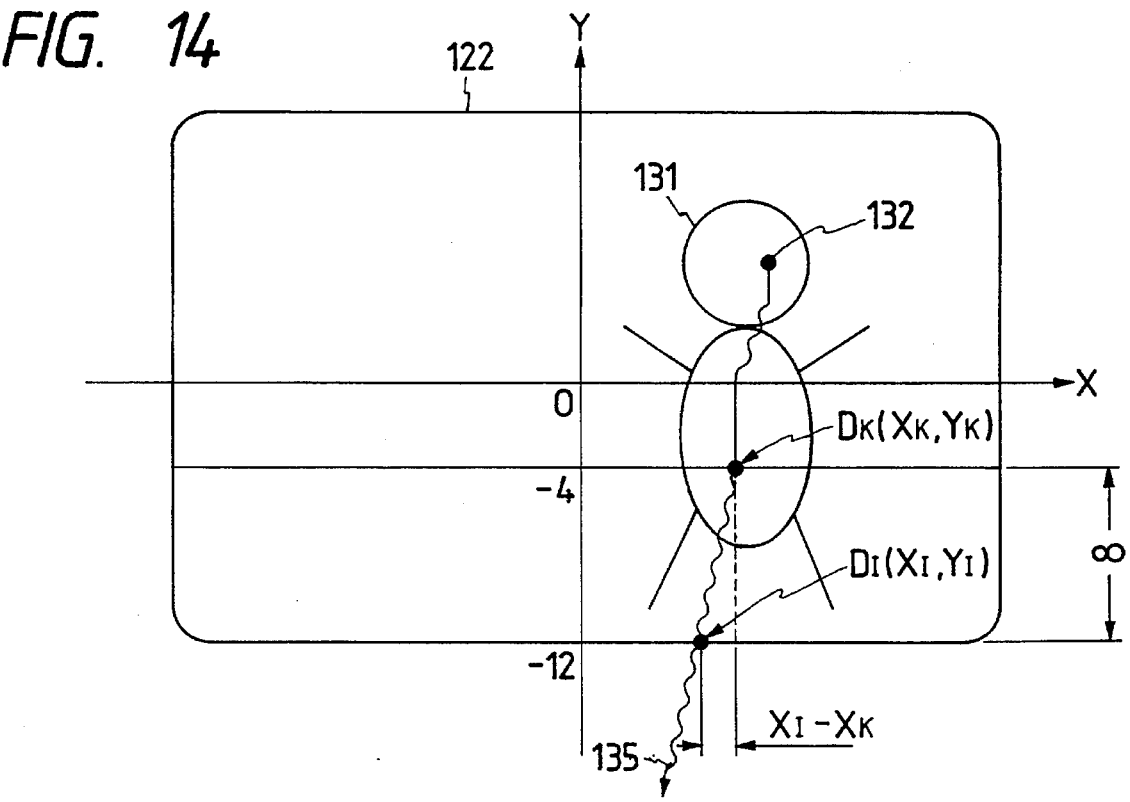
FIG. 14 is a graph showing the operation procedure of the camera in accordance with the present invention.

Next, the procedures for a release operation carried out by the CPU 101 (FIG. 10) will now be described with reference to FIG. 14, FIG. 15A and 15B. FIG. 14 shows position of each parts in the visual field of the finder using an X-Y coordinate.

Figures 2, 15A:
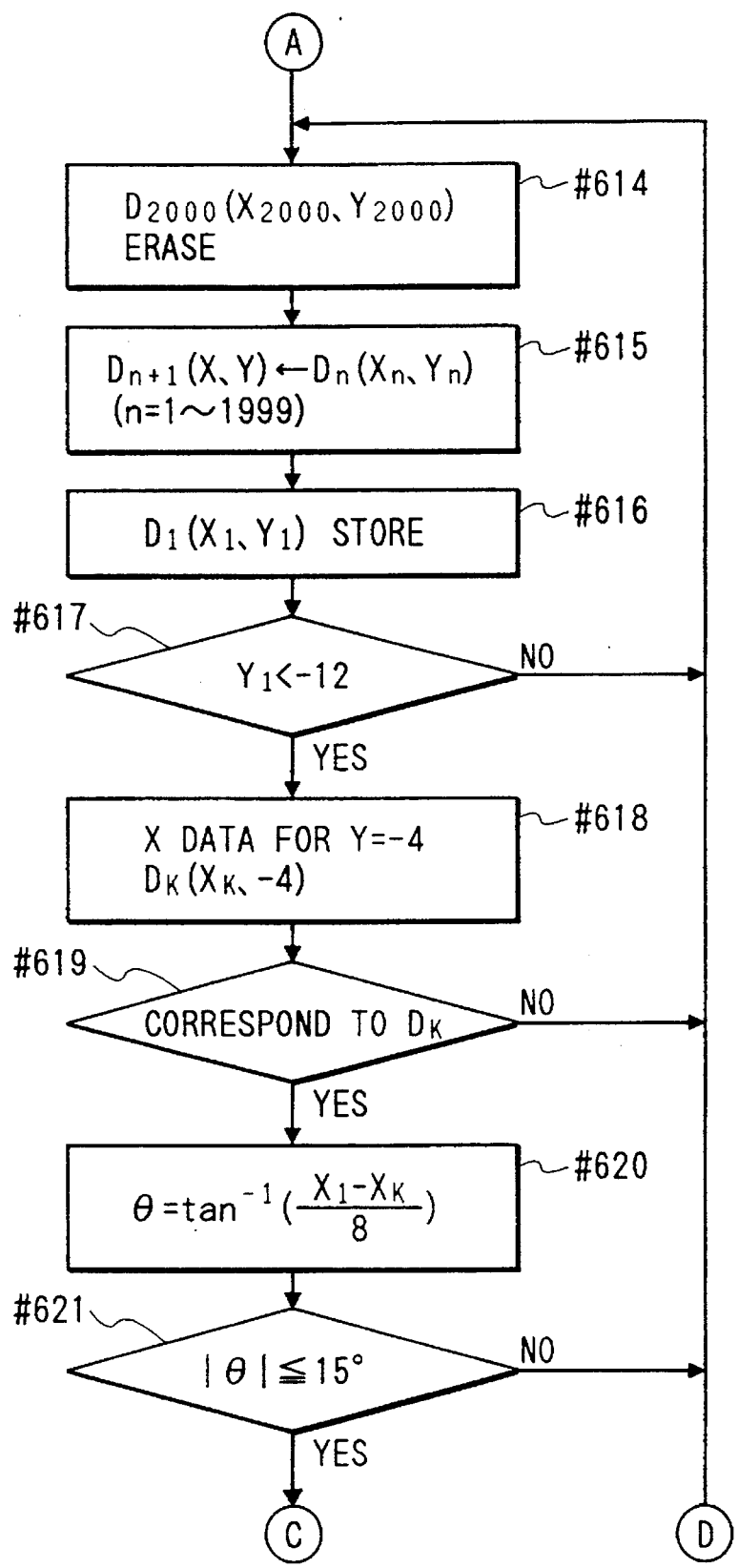
FIGS. 15A consisting of FIGS. 15A-1 and 15A-2 and 15B are flow charts showing the flow of releasing operation in a camera of the present invention.
Figure 15B:
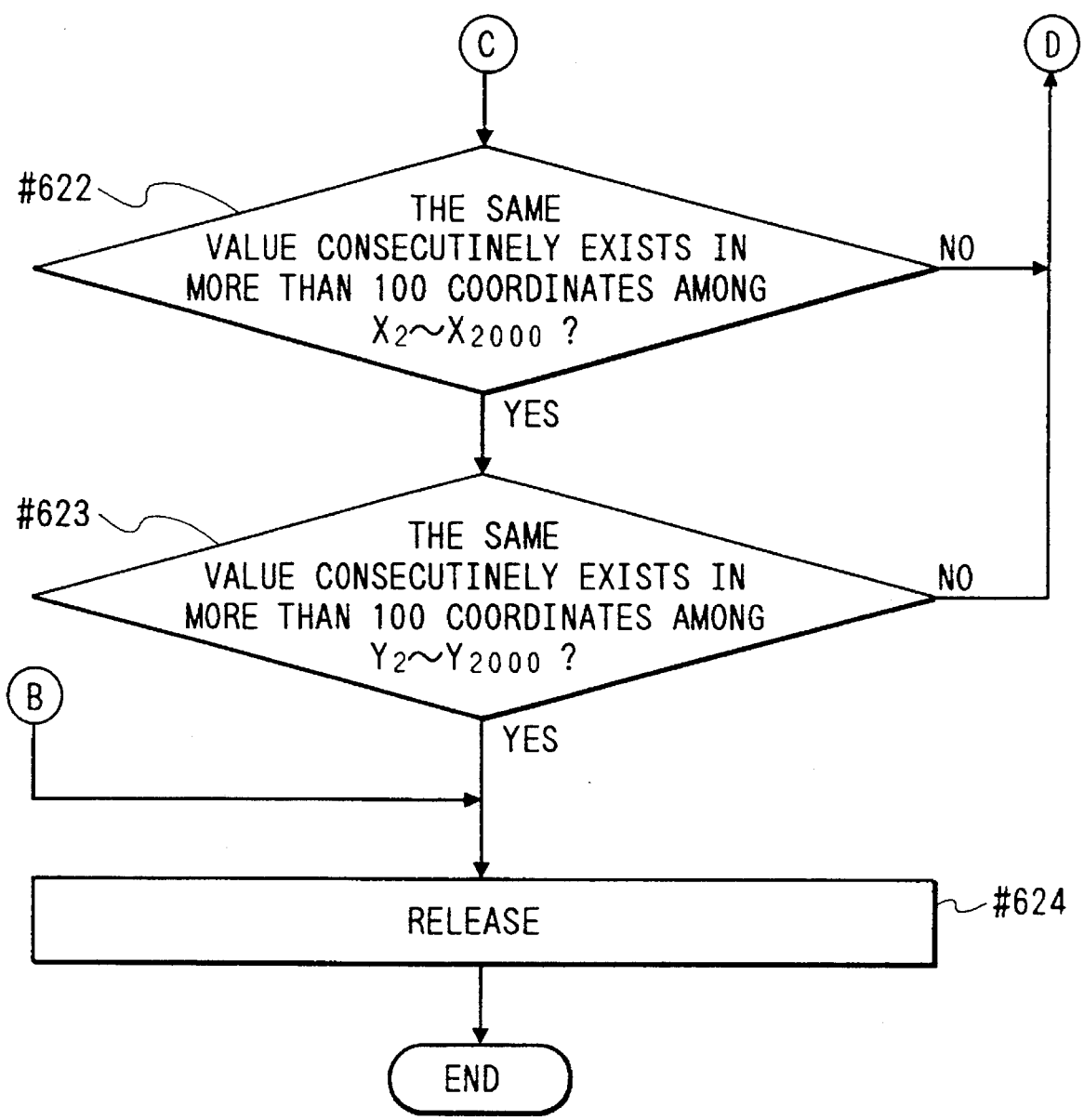

First, as shown in step #601 at the beginning of the process shown in FIG. 15A-1, a camera operator selects a release mode with the release mode selecting device 104. At step #602, it is determined whether the release mode selected at step #601 is the release mode using the release button 102 and, if YES, the process proceeds to step #603. At step #603, it is determined whether the release button 102 has been depressed or not and, when the release button 102 is depressed, the process proceeds to step #624 at which the camera is released.

When it is determined at step #602 that it is the release mode using eye-gaze detection, the process proceeds to step #604 at which the attitude of the camera is detected by the attitude detecting device 107. When it is determined that the attitude of the camera detected at step #604 is horizontal, the process proceeds to step #606 at which the displays under the visual field frame in the finder are put out. When it is determined at step #605 that the attitude of the camera is not horizontal, the process proceeds to step #607 at which it is determined whether the attitude of the camera is vertical and, at the same time, it is held its right side down. When the left side of the camera is down, the process proceeds to step #608 at which the displays on the right side (in the case of horizontal attitude) are put out.

After execution of any of steps #606, #608 and #609, parameter n is set at 2000 at step #610; an eye-gaze position Dn (Xn, Yn) is stored at step #611; and the value of n is decremented by 1 at step #612. At step #613, it is determined whether n is smaller than 0 and, if n is not smaller than 0, the process returns to step #611.

In other words, the processes at steps from #610 to #613 are a process wherein the eye-gaze position Dn is stored in time series on a predetermined cycle (1 ms in the present embodiment) as 2000 positions from D1 to D2000. Among the positions D1–D2000, D2000 is the oldest and D1 is the newest.

When it is determined at step #613 that n is smaller than 0, the process proceeds to step #614 in FIG. 15A-2 at which the position data (X2000, Y2000) for D2000 is erased. Then, at step #615, data position data (Xn, Yn) for Dn is substituted for the position data for Dn+1 (n= 1–1999). Then, at step #616, new position data (X1, Y1) is stored as data for D1. At step #617, it is determined whether the Y coordinate Y1 of the new eye-gaze position D1 is smaller than −12 and, when it is smaller than −12, it means that the eye-gaze has moved to the outside of the visual field frame 122 and, the process proceeds to step #618. If not, the process returns to step #614. At step #618, among the data for the eye-gaze position D, data Dk (Xk, −4) for a case that Y= −4 is retrieved. Then, at step #619, it is determined whether data corresponding to Dk exists or not. When it does not exists, it means that the eye-gaze started in a position lower than Dk and, the process returns to step #614. If it is determined at step #619 that data corresponding to Dk exists, the step proceeds to step #620 at which the slope of a segment connecting Dk and D1 is obtained according to the following formula.

$$\theta = \tan^{-1}((X1-Xk)/8)$$

The angle of the direction at which an eye-gaze moves across the visual field frame 122 is represented by the value of this angle θ.

Next, at step #621, it is determined whether the absolute value of an angle θ obtained as described above is smaller than 15 degrees or not. When it is not smaller than 15 degrees, the process returns to step #614. When it is smaller than 15 degrees, the process proceeds to step #622. At step #622 (FIG. 15B), it is determined whether the same value exists in more than 100 consecutive coordinates among the X coordinates from X2 to X2000 of the stored position data. If it exists, it means that there was a point at which the eye-gaze position D did not move in X direction for 100 ms or longer because the sampling interval for the eye-gaze position D is 1 ms. In this case, the process proceeds to step #623 at which it is similarly determined whether the same value exists in more than 100 consecutive coordinates among the Y coordinates from Y2 to Y2000 of the stored position data. If it exists, it means that there was a point at which the eye-gaze position D did not move in Y direction for 100 ms or longer because the sampling interval for the eye-gaze position D is 1 ms. Therefore, when both of steps #622 and #623 are satisfied, it means that the camera operator has gazed into a point for 100 ms or longer before the eye-gaze moves in a predetermined direction and, in this case, the process proceeds to step #624 at which the camera is released. If the same value does not exist in more than 100 consecutive coordinates among the Y coordinates from Y2 to Y2000, the process returns to step #614.

Figure 16:
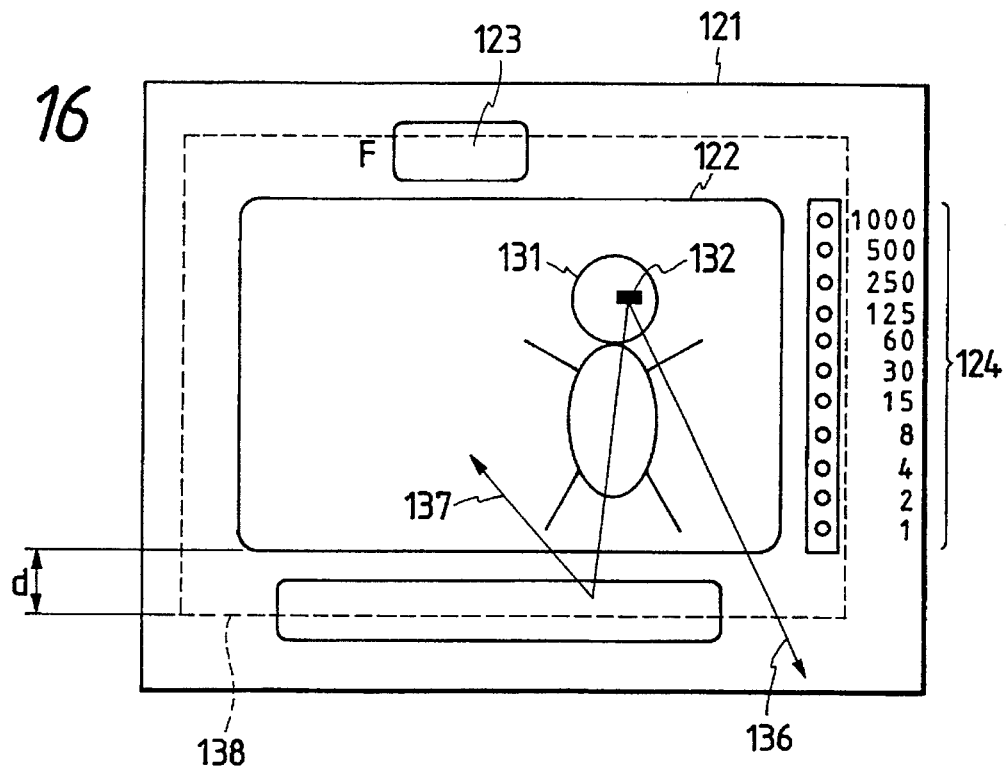
FIG. 16 is an illustration of a sight in a viewing finder of another embodiment of the camera in accordance with the present invention.

FIG. 16 shows the inside of a finder of a camera of another embodiment of the present invention. In this figure, parts identical to those in FIG. 11 and FIG. 12 are indicated by the same reference numerals as in FIG. 11 and FIG. 12 and description will be omitted for them.

In FIG. 16, the camera operator gazes a portion 132 of a primary subject 131 in the visual field frame, and then he moves his eye-gaze along the visual field frame 136 as indicated by 136. When the eye-gaze crosses a rectangle 138 which is out of the visual field frame 122 and is spaced from each side thereof by a distance d, the camera is release. Also, when the eye-gaze is returned before it crosses the rectangle 138 as indicated by the arrow 137, the camera is not released.

Though the camera is held horizontally in this case, the displays are all put out because the direction of the release operation is not specified.

Figure 17:
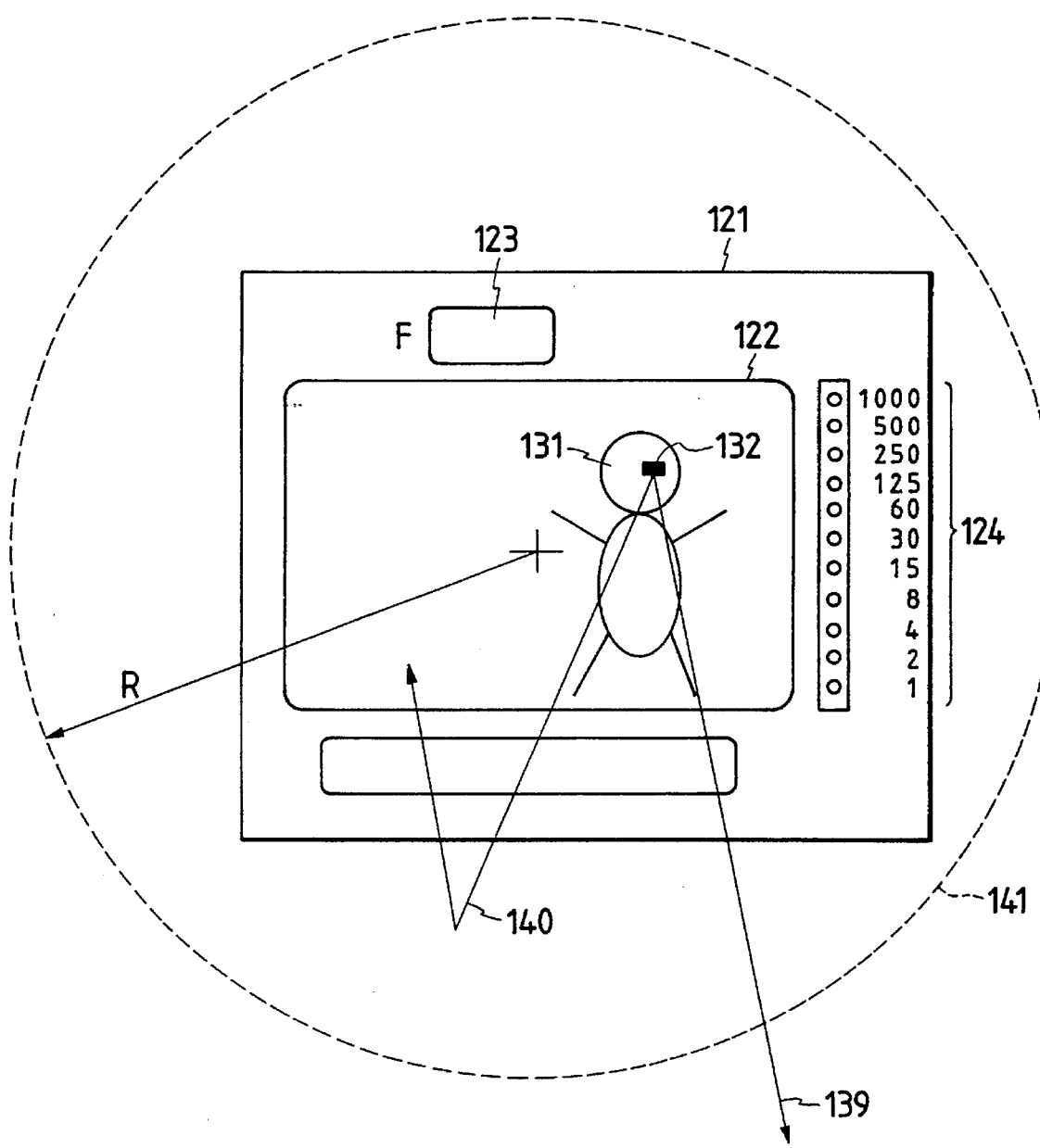
FIG. 17 is an illustration of a sight in a viewing finder of still another embodiment of the camera in accordance with the present invention.

FIG. 17 shows the inside of a camera of another embodiment of the present invention and the periphery thereof. In this case, the camera operator gazes a portion 132 of a primary subject 131 in the visual field frame, and then he moves his eye-gaze towards the outside of the visual field frame 136 as indicated by 139. When the eye-gaze crosses a circle 141 which has a predetermined radius R (e.g., a frame of an eye cap) and is centered on the center of the visual field frame 122, the camera is release. Also, when the eye-gaze is returned before it crosses the circle 141 as indicated by the arrow 130, the camera is not released. Again, though the camera is held horizontally in this case, the displays are all put out because the direction of the release operation is not specified.

Figure 18:
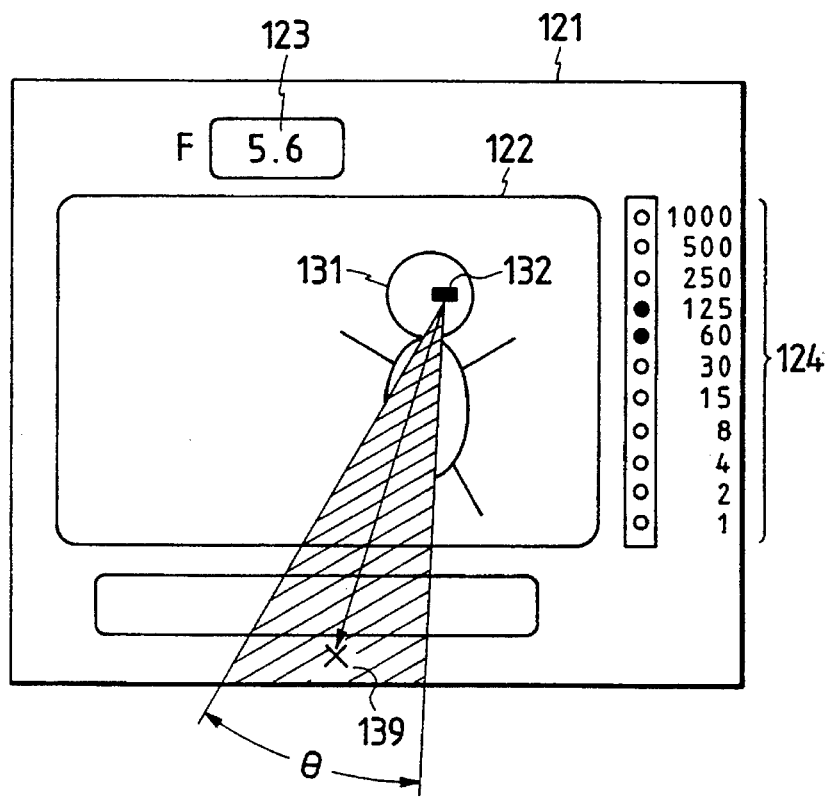
FIG. 18 is an illustration of a sight in a viewing finder of a further embodiment of the camera in accordance with the present invention.

Though the direction of the eye-gaze release operation is shown to be carried out within a predetermined angle in the vertical direction in FIG. 12 and FIG. 13, the release operation may be carried out when an eye-gaze moves downward in the direction of a predetermined position 139 outside the visual field frame which is not the vertical direction, within a area indicated by the oblique lines including the range of an allowable width θ, as shown in FIG. 18. In any of the above cases, an eye-gaze moves in a predetermined downward direction with a certain width. The reason is that it is difficult and may be unnatural from the viewpoint of ergonomics to move one's eye-gaze in lateral (left or right) or upward directions when compared with moving it downward. In addition, downward eye-gaze movement is shorter in-distance compared with the lateral movement and allows a timely photo-taking operation. The allowable width is provided in order to avoid an erroneous release operation due to voluntary eye-gaze movement. For this purpose, the adequate value for θ is 30 degrees or less, and the possibility of malfunction is reduced if θ is, for example, 20 degrees or less. Further, the possibility of malfunction can be very small if a release operation is carried out when an eye-gaze moves in this predetermined angle θ, for example, in a straight line in a predetermined period of time.

Though the above description has been made on the case wherein an eye-gaze moves downward, from the viewpoint of ergonomics, it is apparent that the present invention is not necessarily limited to the downward movement and the direction of the movement may be arbitrarily selected. Further, the portion of the displays to be put out may be automatically changed according to the selection of the direction.

As described above, according to the present invention, a camera is released using eye-gaze detection. Thus, a release operation can be carried out without depressing a release button with good operability. Therefore, camera shakes which have occurred when a release button is depressed will be completely eliminated. Further, a camera which can be easily operate will be realized.

Figure 19:
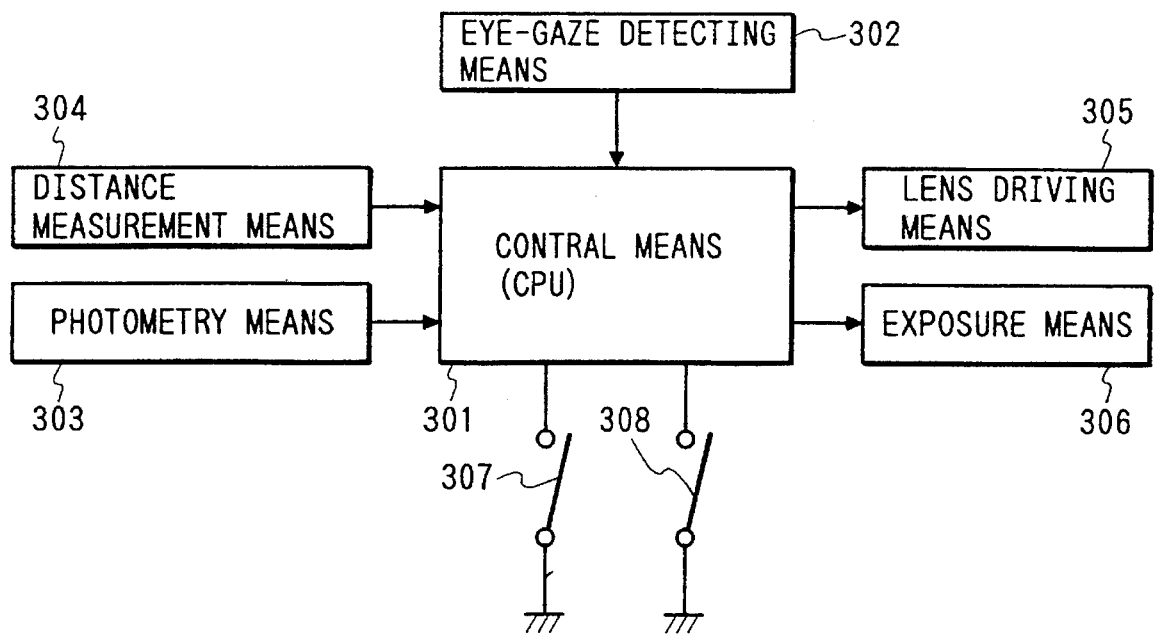
FIG. 19 is a block diagram of an embodiment of the eye-gaze input type camera in accordance with the present invention.
Figure 20:
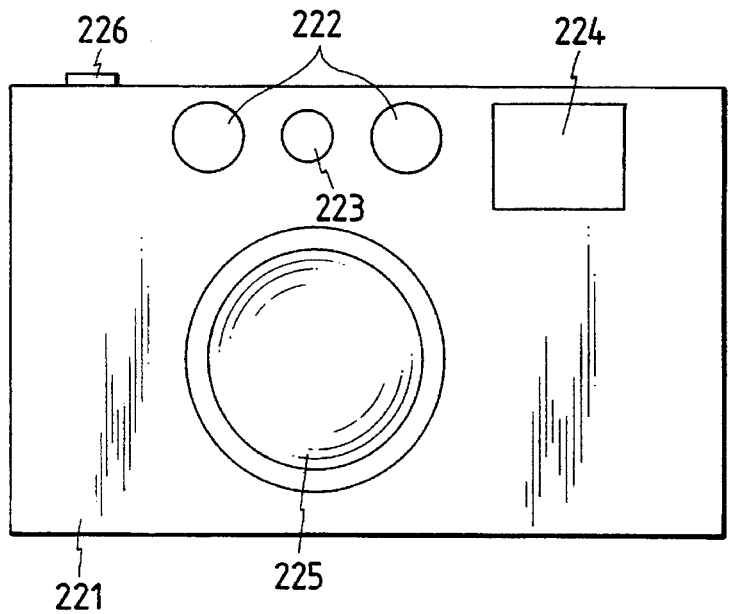
FIG. 20 is a front elevational view of the camera shown in FIG. 19.
Figure 21:
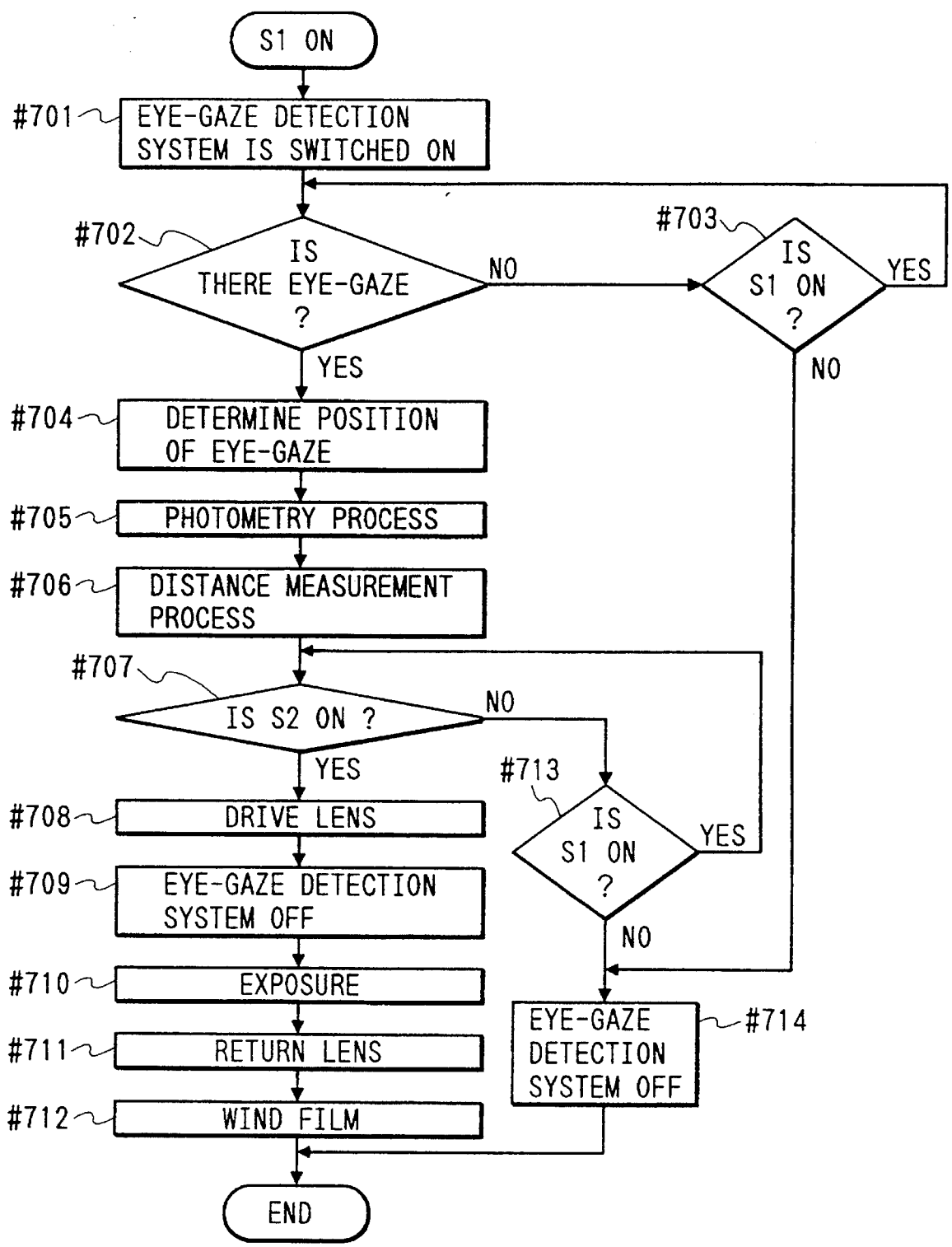
FIG. 21 is a flow chart showing the flow of operation of the control means.

Another embodiment will now be described in detail with reference to the accompanying drawings and the like. FIG. 19–FIG. 21 are drawings showing an embodiment of an eye-gaze input camera according to the present invention. FIG. 19 is a block diagram. FIG. 20 is the front view of the camera. FIG. 21 is a flow chart showing the operation of a control device.

As shown in FIG. 19, a control circuit of an eye-gaze input camera according to the present invention has a configuration whose key element is a control device (CPU) 201 controlling the camera system. An eye-gaze detecting device 202, a photometry device 203, a distance measurement device 204, a lens driving device 205, an exposure device 206, a half-push switch (S1) 207, and a release switch (S2) 208 are connected to the CPU 201.

In FIG. 20, a distance measurement window 222 for distance measurement, a photometry window 223 for photometry, a finder 224, a photo-taking lens 225, and a release button 226 are provided on the respective positions on a camera body 221.

The eye-gaze detecting device 202 detects a point in the finder into which a camera operator is gazing, and this may be, for example, a type which detects such an eye-gaze point from an image reflected from a cornea or a crystal lens (e.g., the device disclosed in Japanese Patent Laid-Open No. 1-274736).

The photometry device 203 performs a photometric operation on a plurality of areas in a photo-taking screen from incident light from the photometry window 223 and inputs the data thereof to the CPU 201 which calculates an exposure value.

The distance measurement device 204 measures the distance to a subject from incident light to the distance measurement window 222 and outputs the data thereof to the CPU 201 which calculates the quantity of the movement of a focusing lens which is not shown.

The lens driving device 205 controls the driving of the photo-taking lens 225 with respect to the position of a focal point detected by the distance measurement device 204 in accordance with the quantity of the movement of the focusing lens calculated by the CPU 201.

The exposure device 206 controls a shutter speed and an aperture value in accordance with the exposure value measured by the photometry device 203 and calculated by the CPU 201.

The half-push switch (S1) 207 and the release switch (S2) 208 are adapted to release the shutter in an operation wherein the half-push switch 207 is switched on when the release button is half-pushed and, when the release button further pushed to its full stroke, the release switch is switched on.

Next, the operation of the eye-gaze input camera according to the present invention will now be described with emphasis on the operation of the CPU 201 with reference to FIG. 21.

As shown in FIG. 21, first, half-push by a camera operator on the release button 226 in FIG. 20 sets a photo-taking mode wherein the half-push switch (S1) 207 is on and wherein the entire eye-gaze detecting system operates (#701).

Next, the eye-gaze detecting device 202 determines whether there is an eye-gaze in the finder 224 (#702). When no eye-gaze is detected, it is determined whether the half-push switch (S1) 207 is on or not; if yes, the process returns to #702; and, if not, the process proceeds to #714.

In other words, #703 is a loop waiting for an input of an eye-gaze and, when the release button 226 (the half-push switch 207) is switched off in the course thereof, the operation of the eye-gaze detecting system stops terminating the photo-taking mode.

When presence of a camera operator's eye-gaze is detected at #702, the eye-gaze detecting device 202 outputs a signal to the CPU 201, which corresponds to the position of a point on the photo-taking screen into which the camera operator is gazing. Then, the CPU 201 determines the place where the camera operator is looking at, and sets a primary subject in the photo-taking screen (#704).

At #705, the photometry device 203 performs a photometric operation on the primary subject determined at #704, and exposure conditions (aperture, shutter speed, strobe illumination, and the like) are set by the CPU 201 on the basis of the output of the photometry device 203.

Further, the distance measurement device 204 performs distance measurement on the primary subject, and distance conditions (the quantity of lens extension and the like) are set by the CPU 201 on the basis of the output of the distance measurement device 204 (#706).

Therefore, the process can not proceed to #707 to be described later until the photometric operation and the distance measurement are performed on the primary subject by the photometry device 203 and the distance measurement device 204, respectively. As a result, a photo-taking operation is not carried out when the photometry and distance measurement operations have not been carried out, and it is possible to carry out a photo-taking operation under exposure and distance conditions which are optimum for the primary subject.

Next, it is determined whether the release switch (S2) 208 is on or not (#707), and the process proceeds to a loop which waits for the input of the release switch 208 (the state wherein the release button 226 is fully pushed) (#703). When the half-push switch 207 (the release button 226) is switched off in the course of the loop (#713), the operation of the eye-gaze detecting system stops (#714) terminating the photo-taking mode.

Then, when the release switch (S2) 208 is switched on (#707), the CPU 201 performs automatic focus control by outputting a direction signal which causes to the lens to move in accordance with the distance conditions set at the aforesaid #706, to the lens driving device 205 thereby causing the focusing lens to move (#708).

After focusing is carried out, the operation of the eye-gaze detecting system is stopped (#709), and a shutter, a diaphragm and the like are operated by the exposure device 205 in accordance with the exposure conditions set at the aforesaid #705 to perform exposure on a film carrying out a photo-taking operation (#710). After the photo-taking operation, the focusing lens is returned to the original position by the lens driving device 205 (#701); the film is wound up by one frame (#712); and, the series of operations is thus terminated.

The present invention is not limited by the above-described embodiment, and various modifications may be made within the scope of the present invention.

As to the release prohibiting device, a release operation may be prohibited, for example, using electrical and mechanical devices. Further, the present invention may be applied to an electronic still camera, a video camera, and the like and, in the case of a video camera, a photo-taking operation may be prohibited when no eye-gaze is detected.

As described in detail above, in an eye-gaze input camera according to the present invention, a photo-taking operation is prohibited by a release prohibiting device when a camera operator's eye-gaze is not detected on a photo-taking screen and, as a result, an inadvertent release operation is avoided.

Since a release operation can not be carried out until photometry and distance measurement operations are carried out on a primary subject on the basis of the detection of an eye-gaze, a photo-taking operation can be carried out on a primary subject under proper conditions.

Figure 22:
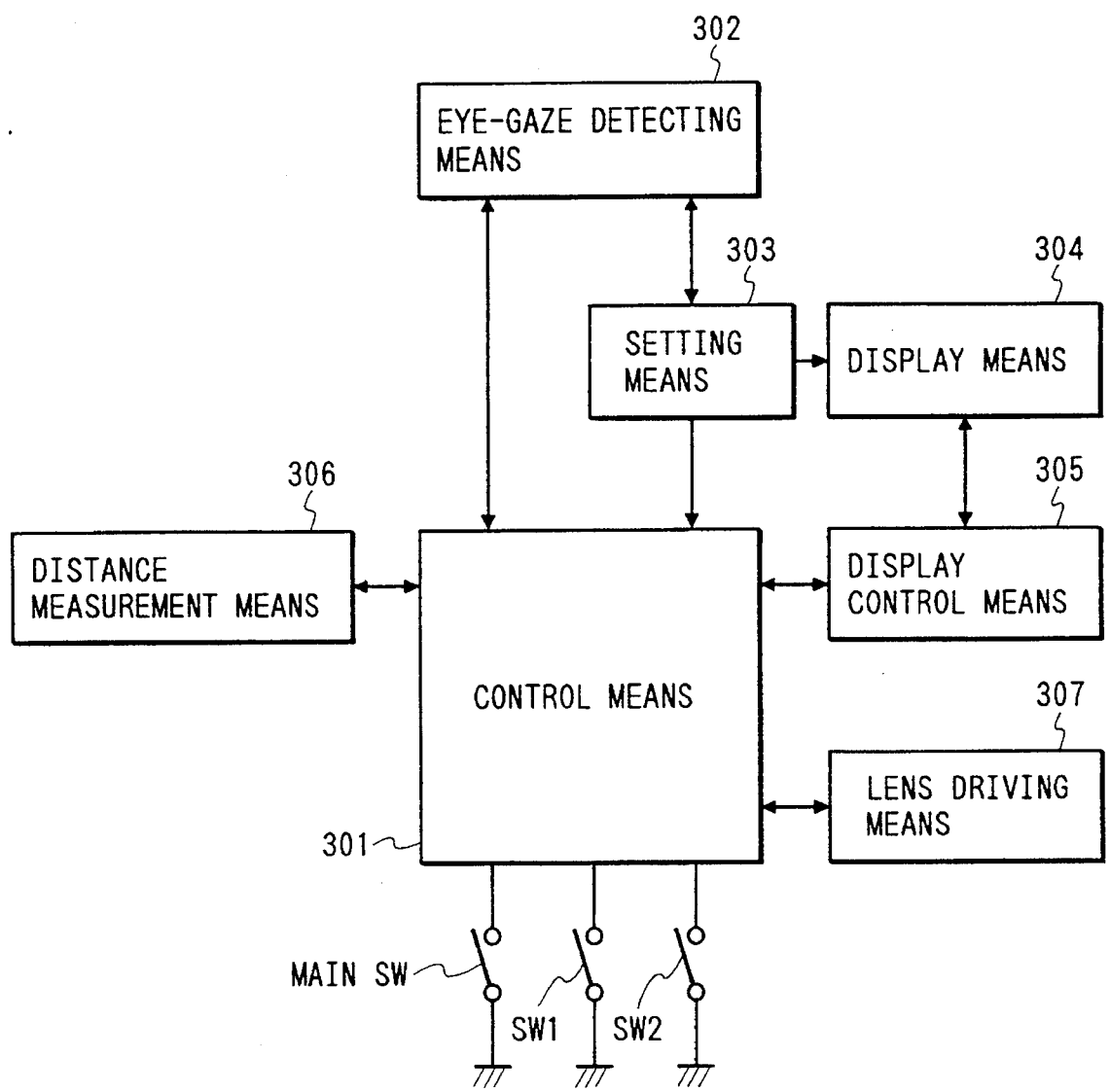
FIG. 22 is a block diagram of a camera embodying the present invention, equipped with an eye-gaze detection means.

FIG. 22 is a block diagram showing an embodiment of a camera having an eye-gaze detecting device according to the present invention. A control device 301 is a device including a microprocessor which controls the entire camera system, to which an eye-gaze detecting device 302, a setting device 303, a display device 304, a display control device 305, a distance measurement device 306, a lens driving device 307, a main switch MAIN-SW, a half-push switch SW1, a release switch SW2, and the like are connected.

The eye-gaze detecting device 302 is a device which detects a point in a finder into which a camera operator is gazing, and this may be, for example, a type which detects such as eye-gaze point from an image reflected from a cornea or a crystal lens (e.g., the device disclosed in Japanese Patent Laid-Open No. 1-274736).

The setting device 303 is a device which transmits information from the eye-gaze detecting device 302 and the like to the control device 301 and sets the values thereof according to a control signal from the control device 301.

The display device 304 is a device for displaying phototaking information set by the setting device 303.

The display control device 305 is a device which controls the display device 304 and acts as an interface performing information exchange between the control device 301 and the display device 304. According to an order from the control device 301, it performs operations such as putting out displays, and causes the display device 304 to display the state of the control system of the camera system when required.

The distance measurement device 306 is a device which measures the distance to a subject from incident light to a distance measurement element, and outputs the information thereof to the control device 301, thereby calculating the quantity of the movement of a focusing lens which is not shown.

The lens driving device 307 is a device for controlling the driving of a photo-taking lens which is not shown, with respect to the position of a focal point detected by the distance measurement device 306 in accordance with the quantity of the movement of the focusing lens calculated by the control device 301.

The main switch MAIN-SW is a switch which activates the control system of the camera system. Further, the half-push switch SW1 is a switch which is switched on when the release button is half-pushed, to initiate a series of operations in eye-gaze detection. The release switch SW2 is a switch which is switched on when the release button is fully pushed to release the shutter. Each of the switches MAIN-SW, SW1, and SW2 is monitored by the control device 301.

Figure 23:
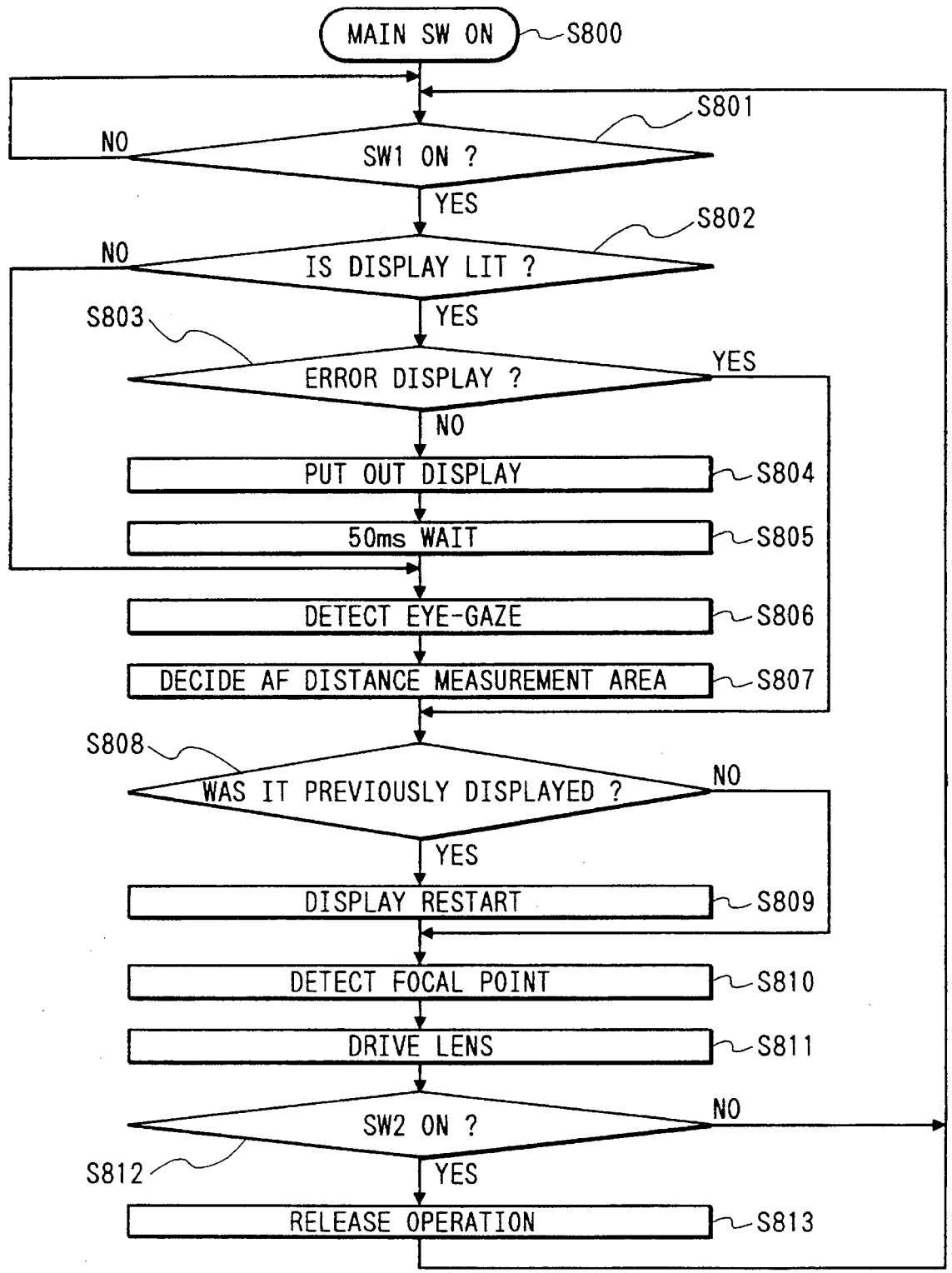
FIG. 23 is a flow chart showing the operation of the camera embodying the present invention, equipped with an eye-gaze detection means.

Next, the operation of the present embodiment will now be described on the basis of FIG. 23 and with reference to the block diagram in FIG. 22. FIG. 23 is a flow chart showing the operation of the control device of the embodiment of a camera having an eye-gaze detecting device according to the present invention. When the main switch MAIN-SW is switched on at step S800, the series of control systems are initialized and stands by for activation.

When a camera operator half-pushes the release button which is not shown at step S801, the half-push switch SW1 is switched on; the eye-gaze operation is started; and the process proceeds to step S802. If the half-push switch SW1 is not switched on, the process remains in the state of waiting for activation of eye-gaze detection.

The state of display is detected at step S802. If the display is lit, the process proceeds to step S803 and, if it is not lit, the process proceeds to step S806 to perform eye-gaze detection immediately.

At step S803, the control device 301 monitors the state of the displays which is lit through the display control device 302. If it is a normal display, the process proceeds to step S804. If it is an error display which must be given priority over the eye-gaze detection from the viewpoint of phototaking operation, the process proceeds to step S808.

At step S804, the display control device 302 puts out the display so that it will not attract the operator's attention.

If an eye-gaze detection operation is carried out at step S805 immediately after the display is put out, the position of the eye-gaze may change due to stimulation when the display is put out, so the control device 301 causes the eye-gaze detecting device 305 to wait for a predetermined period of time (e.g., 50 ms). This waiting time may be the minimum time required for the eye-gaze dislocated by the stimulation caused when the display was put out to return to the initial position.

At step S806, the eye-gaze is detected by the eye-gaze detecting device 305, and an eye-gaze detection position is decided.

Figure 25:
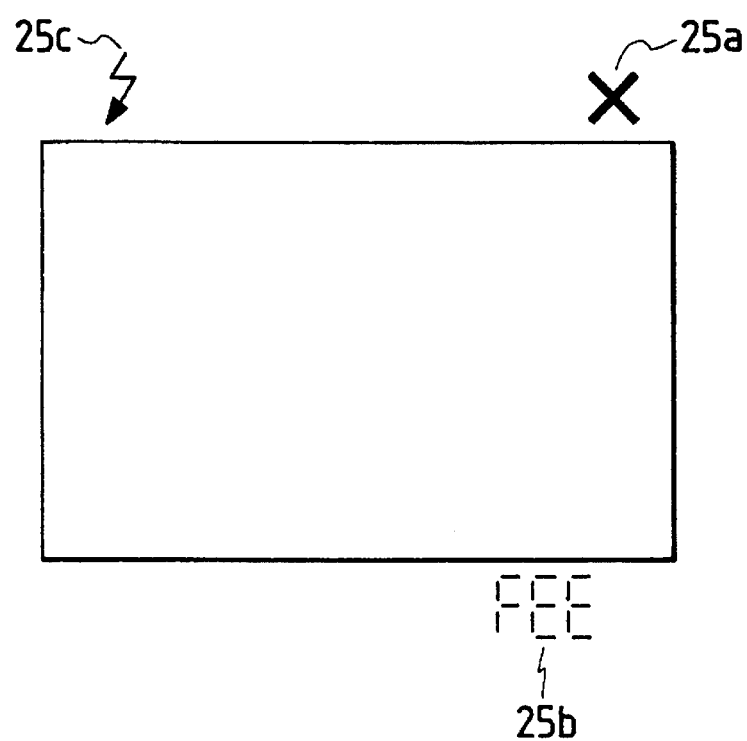
FIG. 25 is a plan view showing an error indicating in the first embodiment.

At step S807, the setting device 304 sets one of the plurality of distance measurement areas shown in FIG. 25 on the basis of the eye-gaze detection position thus set.

At step S808, the state of the display of the display device 304 is monitored again. If the display has been put out, the process proceeds to step S809 and, if it has not been put out, the process proceeds to step S810.

At step S809, the display is lit again because the position to be distance-measured has been set at step S807.

At step S810, focal point detection is performed by the distance measurement device 306 on the area to be distance-measured selected at step S807.

At step S811, the lens driving device 307 drives the photo-taking lens to a focusing position on the basis of the result of the eye-gaze detection at step S810.

When the release switch SW2 is switched on by fully pushing the release button at step S812, the process proceeds to step S813 and, if it remains in off state considering other control information and the like, the process returns to step S801.

A photo-taking release operation is started at step S813 and, when the release operation is complete, the process returns to step S801 which is the state of waiting for activation of an eye-gaze detection.

Figure 24:
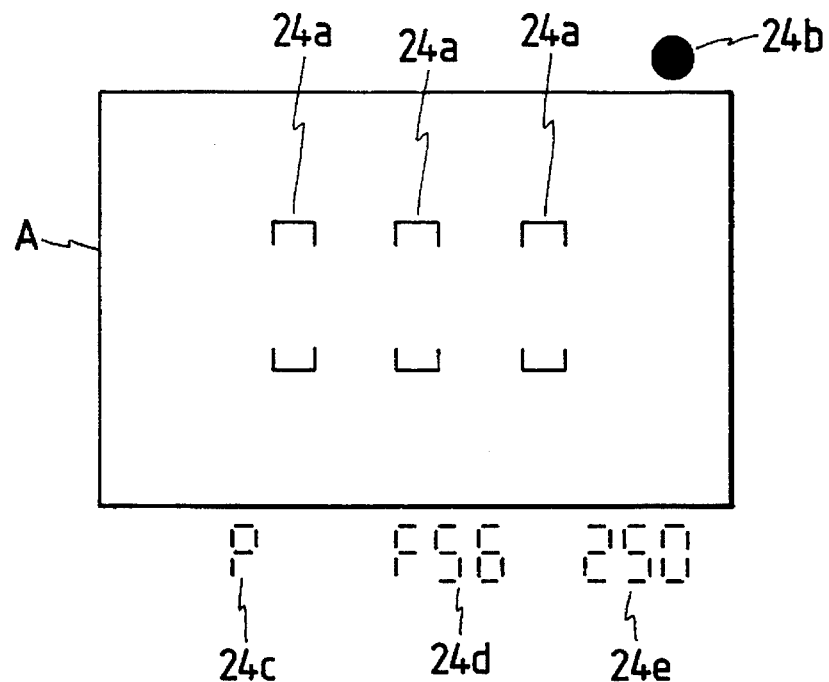
FIG. 24 is a plan view showing a distance measurement area in a display used in the first embodiment.

FIG. 24 and FIG. 25 are plan views showing a display portion for observation of information. FIG. 24 shows a plurality of distance measurement areas 24a, and FIG. 25 shows an example of an error display. A focusing display 24b, a photo-taking mode display 24c, an aperture value display 24d, a shutter speed display 24e and the like which are outside a visual field frame A, may be an example of the normal display in the aforesaid embodiment, while a focal point detection disabled display 25a, an aperture setting error display 25b, and a low luminance alarm 25c which are outside the visual field frame A, may be an example of the error display to go to step S803 as an error.

Besides the previously described embodiment, instead of putting out displays at step S804, the contents of the displays may be fixed, e.g., by prohibiting changing the contents of the display or by decreasing the luminance of the display, and may be returned to the original displays at step S809. With this procedure, it is possible to prevent an eye-gaze from being involuntarily attracted by the stimulation of the displays.

FIG. 26 is a flow chart showing another embodiment of a camera having an eye-gaze detecting device according to the present invention. The circuit configuration is omitted because it is identical to that shown in FIG. 22, and description will be made with reference to FIG. 26. When the main switch MAIN SW is switched on at step S900, the control system is initialized and stands by for activation for eye-gaze detection.

When a camera operator half-pushes the release button which is not shown at step S901, just as at step S801, causing the half-push switch SW1 to be switched on, the control device 301 monitoring this operation causes eye-gaze detection to start. If the half-push switch SW1 is on, the process proceeds to step S902 and, if it is not on, the process remains in the state of waiting for activation for eye-gaze detection.

At step S902, the eye-gaze detecting device 302 detects the position of an eye-gaze which is input to the control device 301.

At step S903, the control device 302 monitors an eye-gaze detection position of the eye-gaze detecting device 302. If the position is in an area outside the visual field frame A where the display portions exist, the process proceeds to step S904. If it is in the visual field frame, the process proceeds to step S905.

At step S904, the control device 301 determines that the eye-gaze position is outside the visual field frame A, and the camera operator has moved his eye-gaze in order to look at the displays, and it causes the display device 303 to be lit.

At step S905, the control device 301 determines that the detection is under way because the eye-gaze position is outside the visual field frame A and decides an AF distance measurement area shown in FIG. 24 on the basis of the eye-gaze detection position detected at step S902, and the process then proceeds to step S906.

At step S906, the control device monitors the state of the display which is lit through the display control device 302. If it is a normal display, the process proceeds to step S907. If it is an error display which must be given priority over the eye-gaze detection from the viewpoint of photo-taking operation, the process proceeds to step S908.

At step S907, the display control device 302 puts out the normal display because the eye-gaze position is outside the visual field frame.

At step S908, the control device 301 drives a lens to a focusing position with the lens driving device 307 on the basis of the value detected by the distance measurement device 306.

At step S909, a full push on the release button which is not shown causes the switch SW2 to be switched on, just as at step S812, and the control device 301 proceeds to step S910. If it remains in off state, the process returns to step S901.

A photo-taking release operation is started at step S910 and, when the release operation is complete, the process returns to step S901 at which the control device 301 enters a state of waiting for activation of eye-gaze detection.

In the present embodiment, just as in the previous embodiment, an example of the normal display is that shown in FIG. 24, and an example of the error display to go to step S906 as an error is shown in FIG. 25.

Though the present invention has been described with reference to the embodiments, the present invention is not limited thereto, and various modifications may be made. For example, the error display may be changed from the visual display to auditory display.

When there is particular information which must be displayed even if an eye-gaze detection operation is interrupted on the way in order to display the information (e.g., information indicating the occurrence of failures in parts of the camera, or information indicating the fact that the eye-gaze detection is disabled because the intensity of the light reflected from the eyeball is too low), it is desirable to suspend the eye-gaze detection until there is not need for displaying this particular information.

Further, when a camera operator performs an operation of ordering to display during an eye-gaze detection operation because it is necessary to see various displays (various displays as shown in FIG. 24) which have been put out or lowered in the luminance of display, it is desirable to display the various displays in the normal state which is visible or easy to see while interrupting the eye-gaze detection.

An operation of the control device 301 to achieve the above purposes is shown in FIG. 27. The processes shown in the same figure may be replaced with the processes at step S806 in FIG. 23 and step S902 in FIG. 26.

In FIG. 27, an eye-gaze detection is carried out for a predetermined period of time at step S1000. Even if the eye-gaze detection is not completed, i.e., an eye-gaze detection position can not be decided, the process proceeds to step S1001 when a predetermined period time has passed since the beginning of the eye-gaze detection (on the contrary, the eye-gaze detection processes at step S806 in FIG. 23 and step S902 in FIG. 26 are not succeeded by the next steps until the eye-gaze detection is complete).

At the next step S1001, it is determined whether the above particular information has been generated or not. If the result is negative, the process proceeds to step S1002.

At step S1002, it is determined whether a predetermined manual operation has been conducted in order to restart the above-mentioned various displays. The determination on the presence of the manual operation is carried out by connecting a normally open switch (not shown) which is closed only when a push-button (not shown) is depressed, to the control device 301 and by monitoring the state of this switch.

When the result is negative at step S1002, it is determined whether the eye-gaze detection has been completed or not, i.e., whether an eye-gaze detection position has been decided or not. If the result is positive, the process proceeds to the next step. If the result is negative, the process returns to step S1000, and those steps are repeated until any one of the positive result at step S1001, the positive result at step S1002, or the negative result at step S1003 is obtained.

If the result at step S1001 is positive, i.e., if it is determined that the above particular information has been generated, the process proceeds to step S1005; the particular information is displayed in the visual field of the finder; and the process returns to step S1001. Therefore, the display of the particular information in the visual field frame of the finder is continued as long as the result at step S1001 is positive. The reason for not returning from step S1005 to step S1000 to carry out the eye-gaze detection is that it makes no sense to carry out the eye-gaze detection at that time because when the particular information is displayed in the visual field of the finder, it will be surely gazed steadily.

If the result at step S1002 is positive, i.e., if it is determined that the above operation of ordering to display has been performed, the process proceeds to step S1006 at which the various displays which have been put out or lowered in luminance, are displayed outside the visual field frame of the finder, and the process returns to step S1002. Therefore, the various displays will be continued as long as the result at step S1002 is positive. The reason for not returning from step S1005 to step S1000 to carry out the eye-gaze detection is that it makes no sense to carry out the eye-gaze detection at that time because when the above operation of ordering to display is being carried out, the various displays will be surely looked.

As described above, the display in a finder will be less likely to attract the attention of a camera operator; erroneous detection of an eye-gaze position which is not intended by the operator, will not occur; and thus correct positions for distance measurement and photometry can be selected. Therefore, control of multi-point distance measurement and split photometry can be precisely carried out even in a camera having an eye-gaze detecting device.

What is claimed is:

1. A camera comprising:

a finder for an observation of an object corresponding to a photographing image plane; and eye-line detecting means for detecting a position at which a photographer's eye-line is stayed, within the finder;

wherein the eye-line detecting means starts to detect after a predetermined wait time.

2. A camera comprising:

a finder for an observation of an object corresponding to a photographing image plane;

eye-line detecting means for detecting a position at which a photographer's eye-line is stayed, within the finder; and inhibiting time setting means for setting an inhibiting time in which a detection of the eye-line detecting means is inhibited.

3. A camera according to claim 2, wherein the inhibiting time starts in response to a half-push of a release button.

4. A camera comprising:

a finder for an observation of an object corresponding to a photographing image plane;

eye-line detecting means for detecting a position at which a photographer's eye-line is stayed, within the finder;

indicating means for indicating on the finder; and indication control means for generating a control signal operating the indicating means;

wherein a detection of the eye-line detecting means is inhibited for a predetermined time from a generation of a specified control signal from the indication control means.

5. A camera comprising:

a finder for an observation of an object corresponding to a photographing image plane;

eye-line detecting means for detecting a position at which a photographer's eye-line is stayed, within the finder; and indicating means for indicating on the finder;

wherein the eye-line detecting means starts to detect in a case where the indicating means indicates nothing.

6. A camera comprising:

a finder; and an eye-line detecting device which detects a photographer's eye-line position, within the finder;

wherein the eye-line detecting device starts to detect after a predetermined wait time.

7. A camera comprising:

a finder;

an eye-line detecting circuit which detects a photographer's eye-line position, within the finder; and an inhibiting time setting circuit which sets an inhibiting time in which a detection of the eye-line detecting circuit is inhibited.

8. A camera comprising:

a finder;

an eye-line detecting circuit which detects a position at which a photographer's eye-line is stayed, within the finder;

an indicating element which indicates on the finder; and an indication control circuit which generates a control signal operating the indicating element;

wherein a detection of the eye-line detecting circuit is inhibited for a predetermined time from a generation of a specified control signal from the indication control circuit.

9. A camera comprising:

a finder;

an eye-line detecting device which detects a position at which a photographer's eye-line is stayed, within the finder; and an indicating device which indicates on the finder;

wherein the eye-line detecting device starts to detect in a case where the indicating device indicates nothing.

* * * * *